(12) United States Patent  
Kimura et al.

(10) Patent No.: US 12,479,011 B2  
(45) Date of Patent: Nov. 25, 2025

(54) SUBSTRATE PROCESSING SYSTEM AND GROUP MANAGEMENT DEVICE

(71) Applicant: SCREEN Holdings Co., Ltd., Kyoto (JP)

(72) Inventors: Ryuichi Kimura, Kyoto (JP); Naruhisa Miyazaki, Kyoto (JP); Hiroakira Matsui, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 558 days.

(21) Appl. No.: 17/947,623

(22) Filed: Sep. 19, 2022

(65) Prior Publication Data

US 2023/0101147 A1 Mar. 30, 2023

(30) Foreign Application Priority Data

Sep. 24, 2021 (JP) .................................. 2021-155058

(51) Int. Cl.
*B08B 3/02* (2006.01)
*G05D 7/06* (2006.01)

(52) U.S. Cl.
CPC ............. *B08B 3/02* (2013.01); *G05D 7/0617* (2013.01)

(58) Field of Classification Search
CPC ... B08B 3/02; G05D 7/0617; H01L 21/67023; H01L 21/67028; H01L 21/67075; H01L 21/67167; H01L 21/67184; H01L 21/67242; H01L 21/67253; H01L 21/67745

See application file for complete search history.

(56) References Cited

U.S. PATENT DOCUMENTS

| | | | |
|---|---|---|---|
| 2001/0051886 A1 | 12/2001 | Mitsutake et al. | 705/7 |
| 2003/0055522 A1 | 3/2003 | Mukuta et al. | 700/100 |
| 2005/0177273 A1 | 8/2005 | Miyazaki et al. | 700/231 |
| 2011/0265895 A1* | 11/2011 | Okabe | G05D 7/0617 137/561 A |
| 2013/0104996 A1* | 5/2013 | Oh | F16K 11/00 137/861 |

(Continued)

FOREIGN PATENT DOCUMENTS

| | | |
|---|---|---|
| CN | 109494175 A | 3/2019 |
| CN | 111383962 A | 7/2020 |

(Continued)

*Primary Examiner* — Christopher W Carter
(74) *Attorney, Agent, or Firm* — OSTROLENK FABER LLP

(57) ABSTRACT

A substrate processing system includes substrate processing apparatuses and a group management device. The substrate processing apparatuses each include a plan creating section. The plan creating section creates a plan indicating a timing when a processing liquid is used and a flow rate of the processing liquid. The processing liquid is supplied to the substrate processing apparatuses from a single resource system. The group management device includes a processing section. The processing section determines whether the total flow rate of the processing liquid to be used by the substrate processing apparatuses exceeds a threshold value based on the plans created by the substrate processing apparatuses. When determining that the total flow rate exceeds the threshold value, the processing section instructs one of the substrate processing apparatuses to adjust the plan thereof.

20 Claims, 15 Drawing Sheets

(56) References Cited

U.S. PATENT DOCUMENTS

| | | | |
|---|---|---|---|
| 2014/0373935 A1* | 12/2014 | Nishino | G05D 7/0641 |
| | | | 137/102 |
| 2017/0101715 A1* | 4/2017 | Nishizato | G01N 33/0004 |
| 2019/0080938 A1 | 3/2019 | Kawazu et al. | |
| 2019/0204857 A1* | 7/2019 | Yasuda | G05D 7/0664 |
| 2020/0211867 A1 | 7/2020 | Maezono et al. | |
| 2020/0290101 A1* | 9/2020 | Osada | H01L 21/67051 |

FOREIGN PATENT DOCUMENTS

| | | |
|---|---|---|
| JP | 2001102425 A | 4/2001 |
| JP | 2002-055711 A | 2/2002 |
| JP | 2002346487 A | 12/2002 |
| JP | 2003-100576 A | 4/2003 |
| JP | 2003-282386 A | 10/2003 |
| JP | 2010-129600 A | 6/2010 |
| JP | 2020-205338 A | 12/2020 |
| WO | WO 2021/106581 A1 | 6/2021 |

* cited by examiner

SUBSTRATE PROCESSING SYSTEM AND GROUP MANAGEMENT DEVICE

INCORPORATION BY REFERENCE

The present application claims priority under 35 U.S.C. § 119 to Japanese Patent Application No. 2021-155058, filed on Sep. 24, 2021. The contents of this application are incorporated herein by reference in their entirety.

TECHNICAL FIELD

The subject of the present application relates to a substrate processing system and a group management device.

BACKGROUND ART

A substrate processing apparatus is known that processes a substrate with a processing liquid. The substrate processing apparatus is installed in a clean room of a factory. The processing liquid is supplied to the substrate processing apparatus from a resource system installed in the factory.

SUMMARY

Typically, a plurality of substrate processing apparatuses are installed in a factory. As such, when the substrate processing apparatuses process substrates simultaneously, the processing liquid is supplied to the substrate processing apparatuses simultaneously from the resource system of the factory. However, in this case, the total flow rate of the processing liquid used by the substrate processing apparatuses may exceed a maximum flow rate of the processing liquid at which the resource system is capable of supplying the processing liquid. When the total flow rate of the processing liquid used by the substrate processing apparatuses exceeds the maximum flow rate of the resource system, an alarm is issued from each of the substrate processing apparatuses to stop the substrate processing apparatuses.

According to an aspect of the present disclosure, a substrate processing system includes a plurality of substrate processing apparatuses that each perform processing on a substrate and a group management device that manages the substrate processing apparatuses. The substrate processing apparatuses each include a plane creating section and a first communication section. The plan creating section creates a plan indicating a timing when a processing liquid is used and a flow rate of the processing liquid. The first communication section performs communication with the group management device to transmit the plan to the group management device. The processing liquid is supplied to the substrate processing apparatuses from a single resource system. The group management device includes storage, a second communication section, and a processing section. The storage stores therein a threshold value for the flow rate of the processing liquid supplied from the single resource system. The second communication section performs communication with the substrate processing apparatuses to receive the plans from the respective substrate processing apparatuses. The processing section acquires a total flow rate of the processing liquid to be used by the substrate processing apparatuses based on the plans received by the second communication section and that determines whether or not the total flow rate exceeds the threshold value. In response to determination that the total flow rate exceeds the threshold value, the processing section instructs via the second communication section one substrate processing apparatus of the substrate processing apparatuses to adjust the plan of the one substrate processing apparatus. The plan creating section of an instruction target apparatus creates a plan that causes the total flow rate to be equal to or lower than the threshold value, the instruction target apparatus being the one substrate processing apparatus to which plan adjustment is instructed.

In an embodiment, in instructing the plan adjustment, the processing section transmits the plans of the substrate processing apparatuses or the total flow rate of the processing liquid to the instruction target apparatus via the second communication section. The plan creating section of the instruction target apparatus creates the plan that causes the total flow rate to be equal to or lower than the threshold value based on the plans of the substrate processing apparatuses or the total flow rate of the processing liquid.

In an embodiment, the processing section generates adjustment amount information indicating an adjustment amount based on the plans of the substrate processing apparatuses or the total flow rate of the processing liquid, the adjustment amount indicating an adjustment amount that causes the total flow rate to be equal to or lower than the threshold value. In instructing the plan adjustment, the processing section transmits the adjustment amount information to the instruction target apparatus via the second communication section. The plan created by the plan creating section of the instruction target apparatus is a plan that causes the total flow rate to be equal to or lower than the threshold value based on the adjustment amount information.

In an embodiment, the plan adjusted by the creating section of the instruction target apparatus corresponds to a plan for the substrate before the processing starts.

In an embodiment, the processing section determines the instruction target apparatus based on transmission timings that are timings when the substrate processing apparatuses transmit the respective plans to the group management device.

In an embodiment, the processing section determines a substrate processing apparatus of the substrate processing apparatuses that has a latest transmission timing of the transmission timings of the substrate processing apparatuses to be the instruction target apparatus.

In an embodiment, the plans of the substrate processing apparatuses each indicate a substrate processing period that is a period from a time at which the substrate is brought into a corresponding one substrate processing apparatus of the substrate processing apparatuses from outside to a time at which the substrate is brought out of the corresponding one substrate processing apparatus. The processing section determines the instruction target apparatus based on the substrate processing periods.

In an embodiment, the processing section determines a substrate processing apparatus of the substrate processing apparatuses that has a shortest substrate processing period of the substrate processing periods of the substrate processing apparatuses to be the instruction target apparatus.

In an embodiment, the plans of the substrate processing apparatuses each indicate a processing end timing when the processing of the substrate ends or a substrate bringing-out timing when the substrate is brought out of a corresponding one of the substrate processing apparatuses. The processing section determines the instruction target apparatus based on the processing end timings or the substrate bringing-out timings.

In an embodiment, the processing section determines a substrate processing apparatus of the substrate processing apparatuses that has a latest processing end timing of the processing end timings or a latest substrate bringing-out timing of the substrate bringing-out timings of the substrate processing apparatuses to be the instruction target apparatus.

In an embodiment, the plans of the substrate processing apparatuses each indicate a processing start timing when the processing of the substrate starts or a substrate bringing-in timing when the substrate is brought into a corresponding one of the substrate processing apparatuses from outside. The processing section determines the instruction target apparatus based on the processing start timings or the substrate bringing-in timings.

In an embodiment, the processing section determines a substrate processing apparatus of the substrate processing apparatuses that has a latest processing start timing of the processing start timings or a latest substrate bringing-in timing of the substrate bringing-in timings of the substrate processing apparatuses to be the instruction target apparatus.

According to another aspect of the present disclosure, a group management device manages a plurality of substrate processing apparatuses that each perform processing on a substrate. A processing liquid being supplied to the substrate processing apparatuses from a single resource system. The group management device includes storage, a communication section, and a processing section. The storage stores therein a threshold value for a flow rate of the processing liquid supplied from the single resource system. The communication section configured to perform communication with the substrate processing apparatuses to receive a plan indicating a timing when the processing liquid is used and a flow rate of the processing liquid from each of the substrate processing apparatuses. The processing section acquires a total flow rate of the processing liquid to be used by the substrate processing apparatuses based on the plans received by the communication section and determine whether or not the total flow rate exceeds the threshold value. In response to determination that the total flow rate exceeds the threshold value, the processing section instructs via the communication section one substrate processing apparatus of the substrate processing apparatuses to adjust the plan of the one substrate processing apparatus.

In an embodiment, the processing section generates adjustment amount information indicating an adjustment amount based on the plans of the substrate processing apparatuses or the total flow rate of the processing liquid, the adjustment amount being an amount that causes the total flow rate to be equal to or lower than the threshold value. In instructing plan adjustment, the processing section transmits via the communication section the adjustment amount information to the one substrate processing apparatus to which the plan adjustment is instructed.

DETAILED DESCRIPTION

Figure 1:
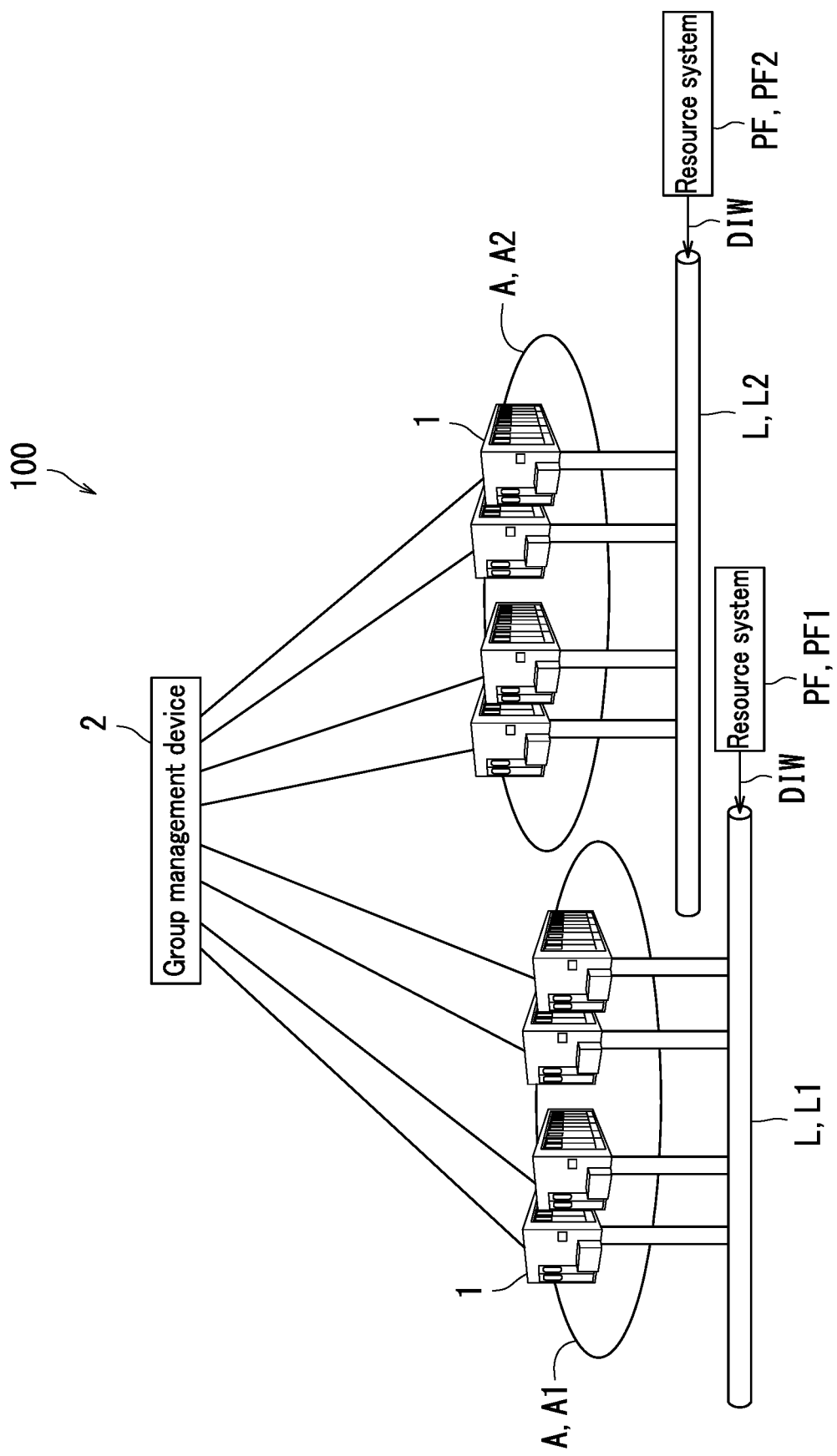
FIG. 1 is a diagram illustrating a substrate processing system according to an embodiment.

The following describes embodiments of a substrate processing system and a group management device, which are the subject matter of the present application, with reference to the accompanying drawings (FIGS. 1 to 20). However, the subject matter of the present application is not limited to the following embodiments and can be practiced in various manners within a scope not deviating from the gist thereof. Note that description is omitted where appropriate in order to avoid repetition. Furthermore, elements that are the same or equivalent are indicated by the same reference signs in the drawings and description thereof is not repeated.

To "substrates" in the following embodiments, various substrates are applicable such as semiconductor wafers, glass substrates for photomask use, glass substrates for liquid crystal display use, glass substrates for plasma display use, substrates for field emission display (FED) use, substrates for optical disk use, substrates for magnetic disk use, and substrates for magneto-optical disk use. Although embodiments are described below using as an example a case with a substrate processing system and a group management device used for processing a disk-shaped semiconductor wafer, the embodiments are also applicable to processing of any of the substrates listed above. Furthermore, various substrate with any shape are also applicable.

With reference to FIGS. 1 to 4, a substrate processing system 100 and a group management device 2 of the present embodiment will be described first. FIG. 1 is a diagram illustrating the substrate processing system 100 of the present embodiment. As illustrated in FIG. 1, the substrate processing system 100 includes a plurality of substrate processing apparatuses 1 and a group management device 2.

The substrate processing apparatuses 1 each process substrates W (see FIG. 5) with a processing liquid. The group management device 2 manages the substrate processing apparatuses 1. Specifically, the group management device 2 is connected to the substrate processing apparatuses 1 in a communicable manner via a network NW (see FIG. 6), and receives various information from the substrate processing apparatuses 1 to manage the substrate processing apparatuses 1. The group management device 2 is a host computer or a server, for example.

More specifically, the group management device 2 manages the substrate processing apparatuses 1 grouped into a plurality of areas A. A plurality of substrate processing apparatuses 1 are installed in each of the areas A.

The processing liquid is supplied to the substrate processing apparatuses 1 installed in the areas A via common lines L from respective common resource systems PF. The group management device 2 sets each area A for a plurality of substrate processing apparatuses 1 to which the processing liquid is supplied from a single resource system PF, and manages the substrate processing apparatuses 1 on a basis of area A by area A.

In the present embodiment, the group management device 2 manages a plurality of substrate processing apparatuses 1 installed in a first area A1 and a plurality of substrate processing apparatuses 1 installed in a second area A2. Although the number of areas A is two in the present embodiment, no particular limitations are placed on the number of the areas A. The number of areas A may be one or three or more.

The resource systems PF include a first resource system PF1 and a second resource system PF2. The first resource system PF1 supplies pure water DIW to the substrate processing apparatuses 1 installed in the first area A1 via a first line L1. Similarly, the second resource system PF2 supplies the pure water DIW to the substrate processing apparatuses 1 installed in the second area A2 via a second line L2. The pure water DIW is deionized water, for example. In the following, an embodiment will be described using a case as an example in which the pure water DIW is supplied from a single resource system PF to the substrate processing apparatuses 1 installed in one area A. The pure water DIW is an example of the "processing liquid".

Figure 2:
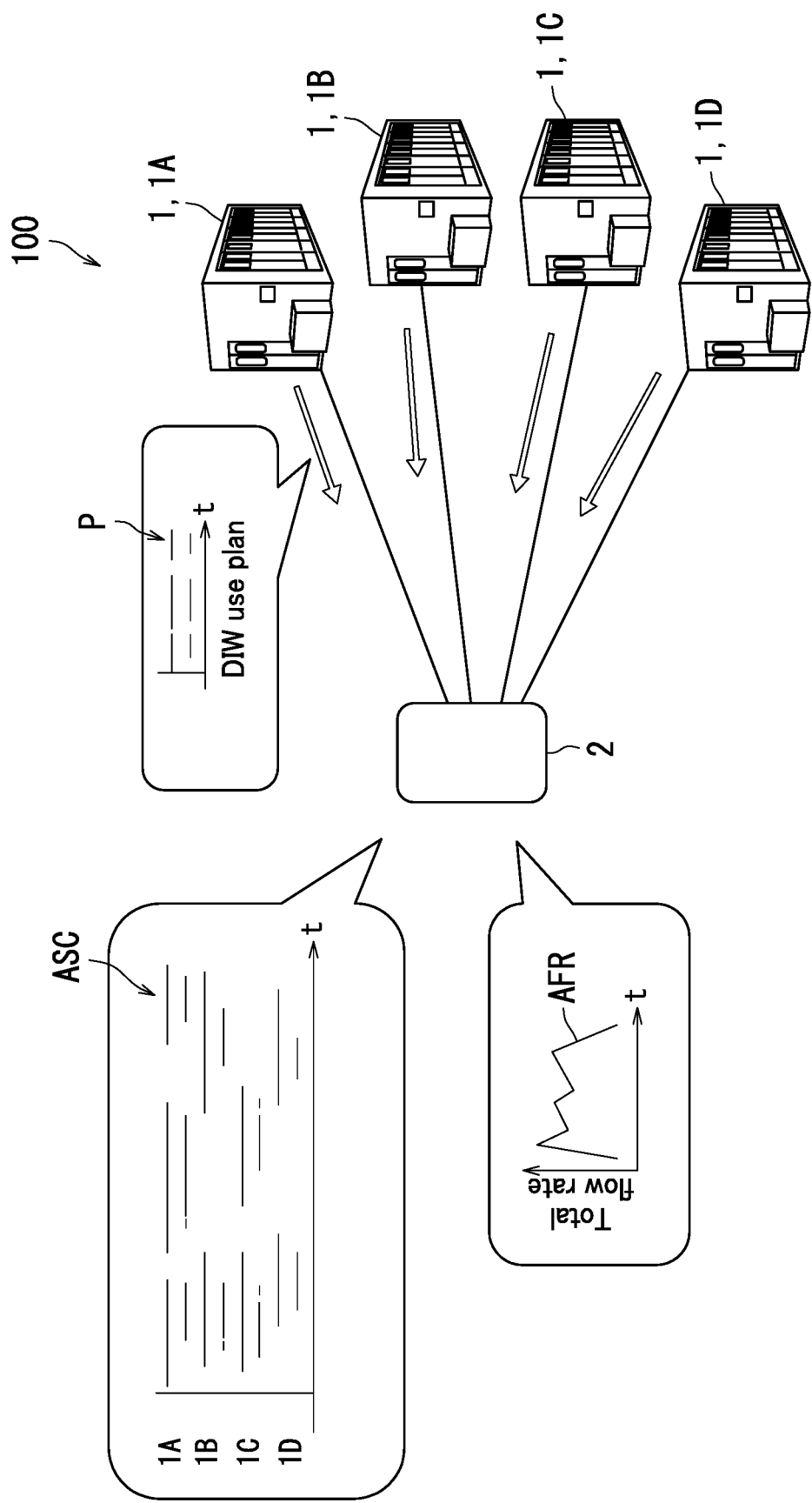
FIG. 2 is a diagram illustrating the substrate processing system according to the embodiment.

The substrate processing system 100 of the present embodiment will be described next with reference to FIG. 2. FIG. 2 is a diagram illustrating the substrate processing system 100 of the present embodiment. However, the substrate processing apparatuses 1 installed in the first area A1 in FIG. 1 are illustrated in FIG. 2 for simplification of description. In the following, an embodiment will be described using a case with the substrate processing apparatuses 1 installed in the first area A1 as an example.

As illustrated in FIG. 2, the substrate processing apparatuses 1 include a substrate processing apparatus 1A, a substrate processing apparatus 1B, a substrate processing apparatus 1C, and a substrate processing apparatus 1D (four substrate processing apparatuses 1) in the present embodiment. The substrate processing apparatuses 1A to 1D are installed in the first area A1 (a single area A) and receive supply of the pure water DIW from the first resource system PF1 (see FIG. 1). The substrate processing apparatuses 1A to 1D are examples of "substrate processing apparatuses installed in a single area". In the following, an embodiment will be described using a case with the substrate processing apparatuses 1A to 1D as an example.

Although the number of the substrate processing apparatuses 1 installed in the first area A1 is four in the present embodiment, no particular limitations are loaded on the number of the substrate processing apparatuses 1 installed in a single area A so long as the number is plural. The number of the substrate processing apparatuses 1 installed in a single area A may be two or three, or five or more.

Figure 6:
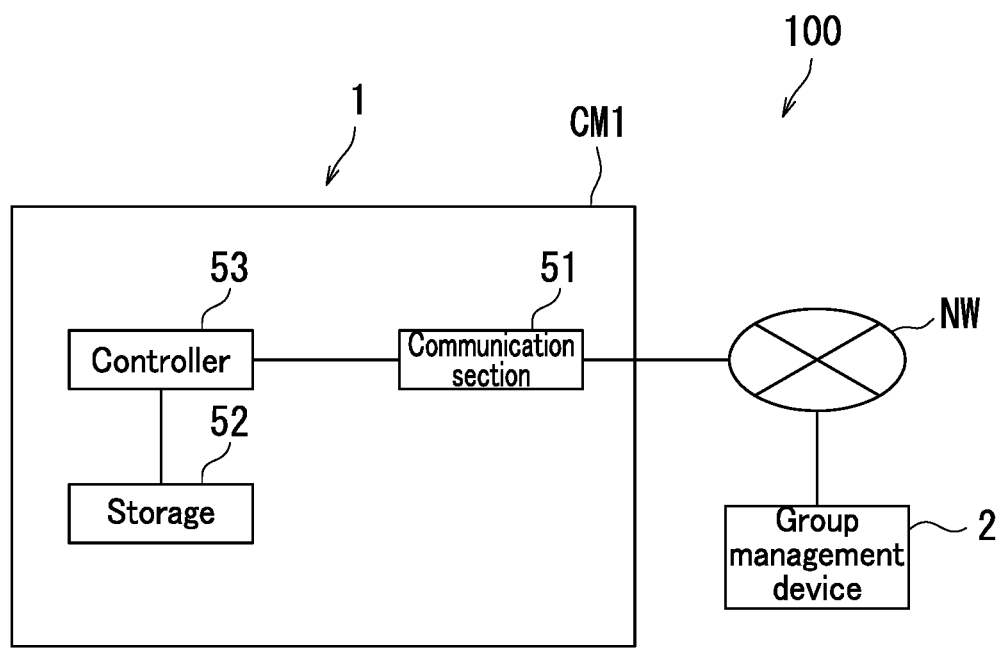
FIG. 6 is a block diagram of the configuration of a computer of the substrate processing apparatus included in the substrate processing system in the embodiment.

Each of the substrate processing apparatuses 1 transmits a use plan for the pure water DIW to the group management device 2 via the network NW (see FIG. 6). In the following, the use plan for the pure water DIW may be referred to as "DIW use plan". The DIW use plan indicates a timing when a corresponding substrate processing apparatus 1 uses the pure water DIW and a flow rate per unit time of the pure water DIW. Specifically, the DIW use plan indicates the timing when the substrate processing apparatus 1 uses the pure water DIW in chronological order. Furthermore, the DIW use plan indicates a time at which the substrate processing apparatus 1 uses the pure water DIW. The flow rate per unit time of the pure water DIW indicates an amount of the pure water DIW used by the substrate processing apparatus 1 per unit time. In the following, the flow rate per unit time of the pure water DIW may be referred to as "flow rate of the pure water DIW".

More specifically, the DIW use plan indicates a timing when the pure water DIW is used and a flow rate of the pure water DIW in a plan after the current time. Each of the substrate processing apparatuses 1 creates a DIW use plan and transmits the created DIW use plan to the group management device 2 each time new substrates W are loaded on load ports LP (see FIG. 5) of the substrate processing apparatus 1.

In the present embodiment, each of the substrate processing apparatuses 1 creates a time schedule P of elements of the substrate processing apparatus 1 and transmits the created time schedule P to the group management device 2. The elements of the substrate processing apparatus 1 include an input section 3, an output section 7, a buffer unit BU, a transport mechanism CV, and a processing unit SP, which will be described later with reference to FIG. 5, for example. The time schedule P indicates a scheduled start time of operation of each element and a scheduled end time of the operation of each element. The time schedule P includes a timing when the pure water DIW is used and a flow rate of the pure water DIW.

As illustrated in FIG. 2, the group management device 2 generates total flow rate information AFR based on the DIW use plans (time schedules P) transmitted from the substrate processing apparatuses 1A to 1D. Here, the total flow rate information AFR indicates the total flow rate of the pure water DIW per unit time used by the substrate processing apparatuses 1A to 1D in chronological order. In the following, the total flow rate per unit time of the pure water DIW may be referred to as "total flow rate of the pure water DIW" or "DIW total flow rate". The DIW total flow rate indicates the total of amounts of the pure water DIW per unit time used by the respective substrate processing apparatuses 1 installed in the single area A. The total flow rate information AFR indicates the DIW total flow rate along the time axis. In detail, the total flow rate information AFR indicates the DIW total flow rate planed for time after the current time.

Specifically, the group management device 2 generates management information ASC into which the DIW use plans (time schedules P) transmitted from the substrate processing apparatuses 1A to 1D are combined, and manages the substrate processing apparatuses 1A to 1D based on the generated management information ASC. Furthermore, the group management device 2 generates the total flow rate information AFR based on the management information ASC.

Figure 3:
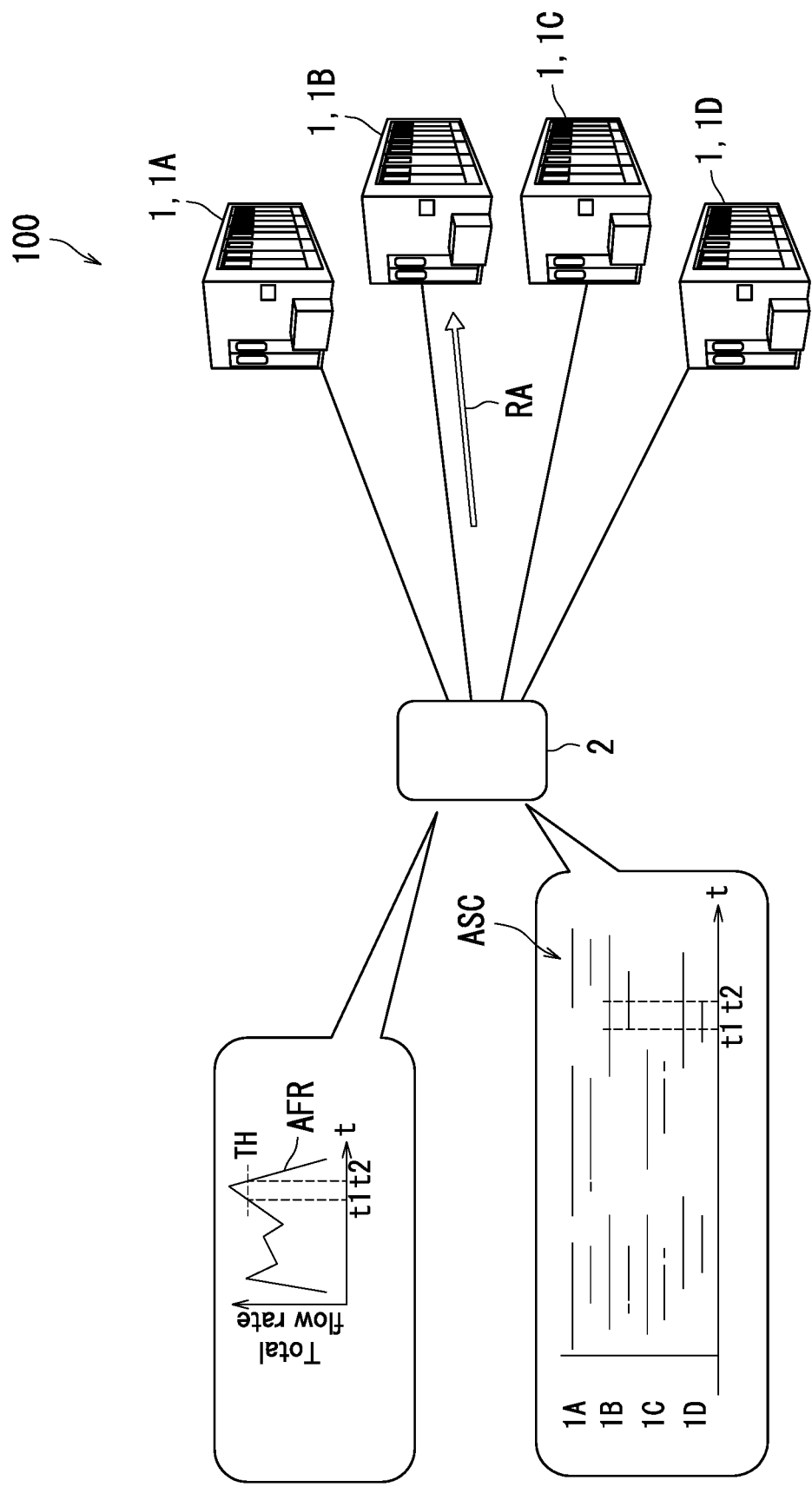
FIG. 3 is a diagram illustrating the substrate processing system according to the embodiment.

FIG. 3 is a diagram illustrating the substrate processing system 100 of the present embodiment. As illustrated in FIG. 3, the group management device 2 determines based on the total flow rate information AFR whether or not the DIW total flow rate exceeds a threshold value TH. Here, the threshold value TH is a threshold value for the flow rate of the pure water DIW supplied from a corresponding resource system PF (see FIG. 1). For example, the threshold value TH may be a threshold value for a maximum flow rate per unit time of the pure water DIW at which the resource system PF (see FIG. 1) is capable of supplying the pure water DIW. In the following, processing of determining whether or not the total flow rate of the pure water DIW exceeds the threshold value TH may be referred to as "threshold determination processing". Also, the maximum flow rate per unit time of the pure water DIW may be referred to as "maximum flow rate of the pure water DIW". Note that the threshold value TH is set on a basis of resource system PF by resource system PF.

When determining that the DIW total flow rate exceeds the threshold value TH as a result of the threshold determination processing, the group management device 2 transmits to one of the substrate processing apparatuses 1A to 1D a readjustment instruction RA instructing adjustment of the DIW use plan thereof. In the following, a substrate processing apparatus 1 to which adjustment of the use plan thereof for using the pure water DIW is instructed may be referred to as "instruction target apparatus".

Specifically, the group management device 2 specifies based on the management information ASC substrate processing apparatuses 1 that use the pure water DIW in a time zone during which the DIW total flow rate exceeds the threshold value TH. Next, the group management device 2 determines one of the substrate processing apparatuses 1 that use the pure water DIW in the time zone during which the DIW total flow rate exceeds the threshold value TH to be the instruction target apparatus. In the following, processing of determining an instruction target apparatus may be referred to as "determination processing".

In the example illustrated in FIG. 3, the DIW total flow rate exceeds the threshold value TH from time t1 to time t2, and the group management device 2 transmits the readjustment instruction RA to the substrate processing apparatus 1B. In the following, an embodiment will be described using as an example a case in which the substrate processing apparatus 1B is an instruction target apparatus.

Figure 4:
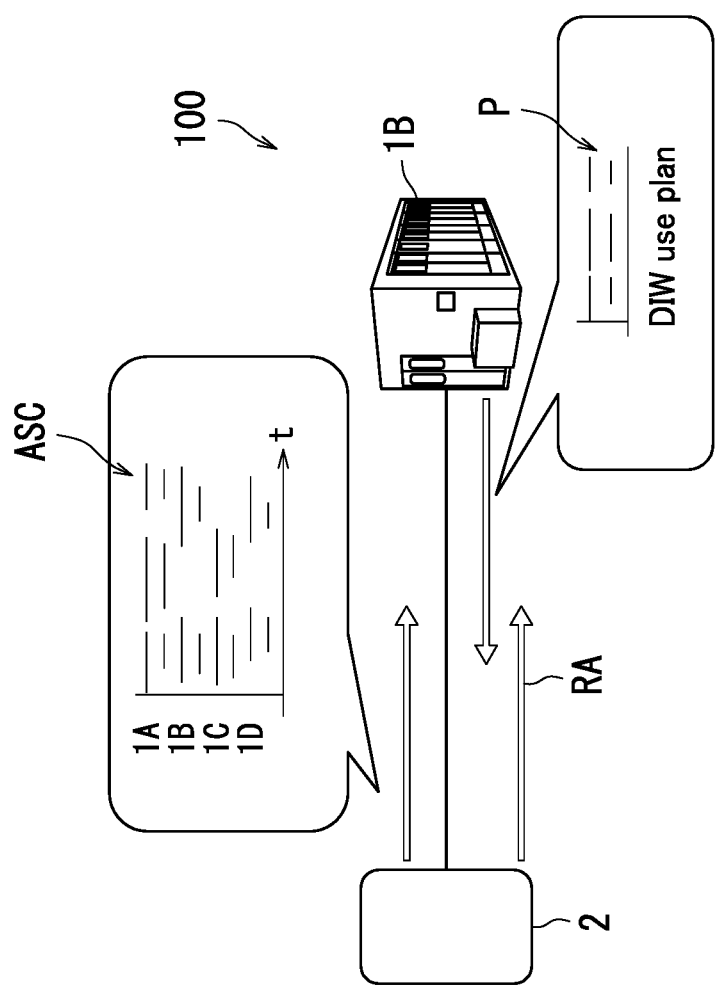
FIG. 4 is a diagram illustrating the substrate processing system according to the embodiment.

FIG. 4 is a diagram of the substrate processing system 100 of the present embodiment. However, only the group management device 2 and the substrate processing apparatus 1B being the instruction target apparatus are illustrated in FIG. 4 for the sake of simplification of the description.

As illustrated in FIG. 4, the group management device 2 in the present embodiment transmits the management information ASC described with reference to FIG. 2 to the substrate processing apparatus 1B (instruction target apparatus) when transmitting the readjustment instruction RA to the substrate processing apparatus 1B (instruction target apparatus). In other words, the group management device 2 transmits the management information ASC together with the readjustment instruction RA to the substrate processing apparatus 1B (instruction target apparatus). The substrate processing apparatus 1B (instruction target apparatus) adjusts the DIW use plan (time schedule P) thereof by referring to the management information ASC. In detail, the substrate processing apparatus 1B adjusts the DIW use plan (time schedule P) of its own by referring to the DIW use plans (time schedules P) of the other substrate processing apparatuses 1 (substrate processing apparatuses 1A, 1C, and 1D) installed in the first area A1.

The substrate processing apparatus 1B transmits the adjusted DIW use plan (time schedule P) to the group management device 2. The group management device 2 updates the DIW use plan (time schedule P) of the substrate processing apparatus 1B to the adjusted DIW use plan (time schedule P), and re-performs the threshold determination processing described with reference to FIG. 3. When a result of the threshold determination processing is that the DIW total flow rate exceeds the threshold value TH, the group management device 2 transmits the readjustment instruction RA to the substrate processing apparatus 1B (instruction target apparatus). That is, the group management device 2 transmits the readjustment instruction RA to the substrate processing apparatus 1B (instruction target apparatus) until the DIW total flow rate does not exceed the threshold value TH. In the above configuration, in the present embodiment, the total flow rate of the pure water DIW used by the substrate processing apparatuses 1 can be inhibited from exceeding the maximum flow rate of the pure water DIW at which the resource system PF is capable of supplying the pure water DIW.

Figure 5:
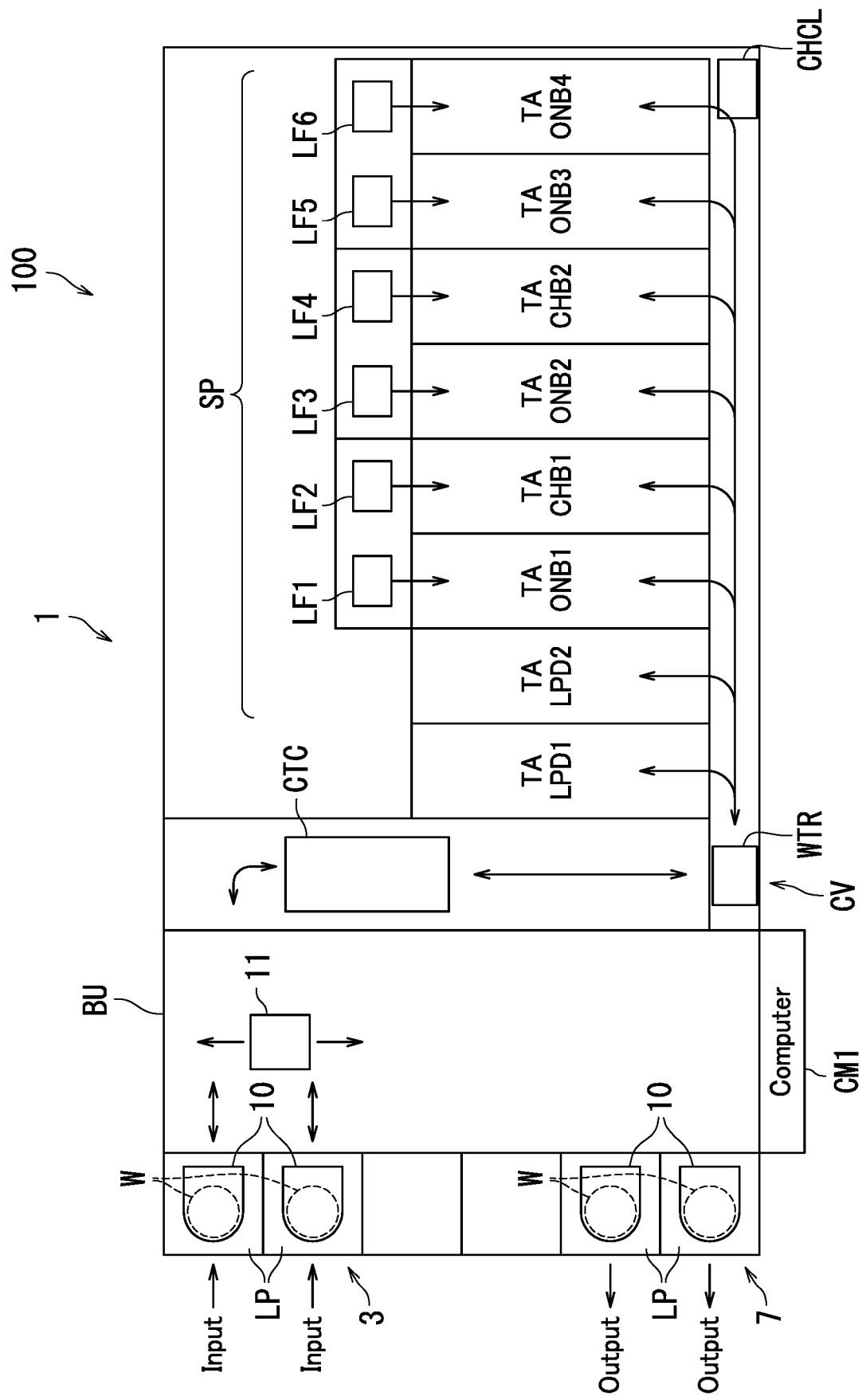
FIG. 5 is a schematic plan view of a substrate processing apparatus included in the substrate processing system in the embodiment.

The substrate processing system 100 and the group management device 2 of the present embodiment will be described next with reference to FIGS. 5 to 19. The configuration of each substrate processing apparatus 1 will be described first with reference to FIG. 5. FIG. 5 is a schematic plan view of a substrate processing apparatus 1 included in the substrate processing system 100 of the present embodiment. As illustrated in FIG. 5, the substrate processing apparatus 1 in the present embodiment is of batch type and processes a plurality of substrates W in a batch. Specifically, the substrate processing apparatus 1 processes the substrates W on a lot-by-lot basis. The lots each include a plurality of substrates W. For example, one lot includes 25 substrates W. In the present embodiment, the substrate processing apparatus 1 executes preprocessing, cleaning, etching, and drying on each lot of substrates W.

As illustrated in FIG. 5, the substrate processing apparatus 1 includes an input section 3, an output section 7, a buffer unit BU, a transport mechanism CV, a processing unit SP, and a computer CM1.

The processing unit SP includes a plurality of tanks TA. In the present embodiment, the tanks TA include two first chemical liquid tanks (a first chemical liquid tank CHB1 and a first chemical liquid tank CHB2), four second chemical liquid tanks (a second chemical liquid tank ONB1, a second chemical liquid tank ONB2, a second chemical liquid tank ONB3, and a second chemical liquid tank ONB4), and two drying tank (a drying tank LPD1 and a drying tank LPD2). That is, the processing unit SP includes eight tanks TA in the present embodiment. Note that the number of the tanks TA is not limited to eight and may be any of one to seven or nine or more.

The transport mechanism CV includes a first transport mechanism CTC and a second transport mechanism WTR. The transport mechanism CV further include a sub-transport mechanism LF1, a sub-transport mechanism LF2, a sub-transport mechanism LF3, a sub-transport mechanism LF4, a sub-transport mechanism LF5, and a sub-transport mechanism LF6. The number of the sub-transport mechanisms is changed according to the number of the tanks TA.

The computer CM1 controls a plurality of accommodation sections 10, the input section 3, the output section 7, the buffer unit BU, the transport mechanism CV, and the processing unit SP.

Each of the accommodation sections 10 accommodates a plurality of substrates W. The substrates W are accommodated in each accommodation section 10 in a horizontal posture. Specifically, each of the accommodation sections 10 accommodates one lot of substrates W. The accommodation sections 10 each are a front opening unified pod (FOUP), for example.

Accommodation sections 10 accommodating non-processed substrates W are loaded at the input section 3. Specifically, the input section 3 includes a plurality of load ports LP. The accommodation sections 10 accommodating the non-processed substrates W are loaded on the load ports LP of the input section 3.

Accommodation sections 10 accommodating processed substrates W are loaded at the output section 7. Specifically, the output section 7 includes a plurality of load ports LP. The accommodation sections 10 accommodating the processed substrates W are loaded on the load ports LP of the output section 7.

The buffer unit BU is disposed adjacent to the input section 3 and the output section 7. The buffer unit BU takes therein the accommodation sections 10 loaded on the input section 3. A shelf (not illustrated) is provided inside the buffer unit BU, and the buffer unit BU loads on the shelf the accommodation sections 10 loaded at the input section 3. The buffer unit BU takes the non-processed substrates W out of the accommodation sections 10 loaded on the shelf and passes the non-processed substrates W to the transport mechanism CV.

The buffer unit BU also takes therein the accommodation sections 10 loaded at the output section 7 and loads the taken accommodation sections 10 on the shelf. The buffer unit BU receives processed substrates W from the transport mechanism CV and accommodates the processed substrates W in the accommodation sections 10 loaded on the shelf. Furthermore, the buffer unit BU outputs the accommodation sections 10 accommodating the processed substrates W to the output section 7.

In detail, the buffer unit BU includes a delivery mechanism 11. The delivery mechanism 11 performs delivery of the accommodation sections 10 between the shelf and the input section 3 and between the shelf and the output section 7. The delivery mechanism 11 also performs delivery of substrates W between the transport mechanism CV and the self. Specifically, the delivery mechanism 11 takes the non-processed substrates W out of two accommodation sections 10 loaded on the shelf and passes the non-processed substrates W to the transport mechanism CV. That is, the delivery mechanism 11 combines two lots of non-processed substrates W into a set and passes the set of the non-processed substrates W to the transport mechanism CV. Also, the delivery mechanism 11 receives two lots of processed substrates W from the transport mechanism CV and accommodates the processed substrates W per lot unit in two accommodation sections 10 loaded on the shelf. In the following the two lots of substrate W may be referred to as "set of substrates W". One set of substrates W includes 50 substrates W, for example.

The transport mechanism CV brings a set of substrates W into the processing unit SP. Furthermore, the transport mechanism CV brings the set of substrates W out of the processing unit SP. Specifically, the transport mechanism CV brings a set of substrates W into each tank TA of the processing unit SP. Furthermore, the transport mechanism CV brings the set of substrates W out of each tank TA of the processing unit SP. The processing unit SP executes the preprocessing, the cleaning, the etching, and the drying on the set of substrates W. The preprocessing, the cleaning, the etching, and the drying each are an example of "substrate processing".

More specifically, the delivery mechanism 11 performs delivery of a set of substrates W between the delivery mechanism 11 and the first transport mechanism CTC. The first transport mechanism CTC changes the posture of the set of substrates W received from the delivery mechanism 11 from the horizontal posture to the vertical posture, and passes the set of substrates W to the second transport mechanism WTR. Furthermore, the first transport mechanism CTC receives a set of processed substrates W from the second transport mechanism WTR, changes the posture of the set of processed substrates W from the vertical posture to the horizontal posture, and passes the set of processed substrates W to the delivery mechanism 11.

The second transport mechanism WTR performs delivery of a set of substrates W among the sub-transport mechanism LF1, the sub-transport mechanism LF2, the sub-transport mechanism LF3, the sub-transport mechanism LF4, the sub-transport mechanism LF5, and the sub-transport mechanism LF6. Furthermore, the second transport mechanism WTR brings the set of substrates W into the drying tanks LPD1 and LPD2 and brings the set of substrates W out of the drying tanks LPD1 and LPD2.

The sub-transport mechanism LF1 brings the set of substrates W into the second chemical liquid tank ONB1 and brings the set of substrate W out of the second chemical liquid tank ONB1. The sub-transport mechanism LF2 brings the set of substrates W into the first chemical liquid tank CHB1 and brings the set of substrates W out of the first chemical liquid tank CHB1. The sub-transport mechanism LF3 brings the set of substrates W into the second chemical liquid tank ONB2 and brings the set of substrates W out of the second chemical liquid tank ONB2. The sub-transport mechanism LF4 brings the set of substrates W into the first chemical liquid tank CHB2 and brings the set of substrates W out of the first chemical liquid tank CHB2. The sub-transport mechanism LF5 brings the set of substrates W into the second chemical liquid tank ONB3 and brings the set of substrate W out of the second chemical liquid tank ONB3. The sub-transport mechanism LF6 brings the set of substrates W into the second chemical liquid tank ONB4 and brings the set of substrates W out of the second chemical liquid tank ONB4.

The first chemical liquid tanks CHB1 and CHB2 perform preprocessing with a chemical liquid on the set of substrates W. The preprocessing is processing with the chemical liquid performed before etching (specifically wet etching). In the present embodiment, the preprocessing is processing for removing natural oxide films from the substrates W. In this case, the chemical liquid may be diluted hydrofluoric acid (DHF), for example.

Specifically, the first chemical liquid tanks CHB1 and CHB2 each include a processing tank that reserves the chemical liquid. The sub-transport mechanism LF2 brings a set of substrates W into the first chemical liquid tank CHB1 to immerse the set of substrates W in the chemical liquid reserved in the processing tank. In the manner described above, the preprocessing is performed on the set of substrates W. Thereafter, the sub-transport mechanism LF2 pulls up the set of substrates W from the chemical liquid in the processing tank and brings the set of substrates W out of the first chemical liquid tank CHB1. The sub-transport mechanism LF4 operates in the same manner as above.

The first chemical liquid tanks CHB1 and CHB2 each further include an ultrasonic generator. The ultrasonic generator generates ultrasonic waves to vibrate the chemical liquid reserved in the corresponding processing tank. This can efficiently remove natural oxide films from the substrates W.

In detail, the ultrasonic generator is disposed outside the processing tank. The pure water DIW flows between the ultrasonic generator and the processing tank for propagating the ultrasonic waves to the processing tank. In the following, the pure water DIW for propagating the ultrasonic waves may be referred to as "propagation water DIW". In the present embodiment, the DIW use plan described with reference to FIG. 2 indicates timings when the propagation water DIW is used in the respective first chemical liquid tanks CHB1 and CHB2 and flow rates of the propagation water DIW in the respective first chemical liquid tanks CHB1 and CHB2. As such, the time schedule P described with reference to FIG. 2 indicates timings when the propagation water DIW is used in the respective first chemical liquid tanks CHB1 and CHB2 and flow rates of the propagation water DIW in the respective first chemical liquid tanks CHB1 and CHB2. Here, a timing when the propagation water DIW is used indicates a time at which flowing of the propagation water DIW starts and a time at which the flowing of the propagation water DIW ends. That is, the timings when the propagation water DIW is used each indicate a period from a start to an end of flow of the propagation water DIW.

Note that the chemical liquid in each processing tank of the first chemical liquid tanks CHB1 and CHB2 is reloaded as appropriate. In chemical liquid replacement, the pure water DIW is introduced into the processing tank for cleaning. The DIW use plan described with reference to FIG. 2 may further indicate timings when the pure water DIW used in cleaning the respective first chemical liquid tanks CHB1 and CHB2 and flow rates of the pure water DIW used in cleaning the respective first chemical liquid tanks CHB1 and CHB2. Here, timings when the pure water DIW is used each indicate a time at which introduction of the pure water DIW into the corresponding processing tank starts and a time at which the introduction of the pure water DIW into the processing tank ends. That is, the timings when the pure water DIW is used each indicate a period from a start to an end of introduction of the pure water DIW into the corresponding processing tank.

The second chemical liquid tanks ONB1 to ONB4 perform cleaning with a rinse liquid and etching with an etching solution, respectively, on one set of substrates W. Specifically, the second chemical liquid tanks ONB1 to ONB4 each include a shower nozzle and a processing tank.

The shower nozzle ejects liquid droplets of the rinse liquid toward a set of substrates W located above the processing tank. In the manner described above, the cleaning with the rinse liquid is performed on the set of substrates W. The rinse liquid contains the pure water DIW. The rinse liquid is the pure water DIW, ozone water, nitrogen water, or hot pure water, for example. The ozone water is a rinse liquid obtained by mixing ozone with the pure water DIW. The nitrogen water is a rinse liquid obtained by mixing nitrogen with the pure water DIW. The hot pure water is a rinse liquid obtained by heating the pure water DIW.

The processing tank reserves the etching solution therein. A set of substrates W is immersed in the etching solution in the processing tank. In the manner described above, the etching with the etching solution is performed on the set of substrates W. The etching solution contains the pure water DIW. Examples of the etching solution include an aqueous solution containing tetramethylammonium hydroxide (TMAH), an aqueous solution containing trimethyl-2-hydroxyethylammonium hydroxide (TMY), and ammonium hydroxide (ammonia water).

The sub-transport mechanism LF1 brings the set of substrates W into the second chemical liquid tank ONB1 to move the set of substrates W above the processing tank. The shower nozzle ejects droplets of the rinse liquid toward the set of substrates W held by the sub-transport mechanism LF1 to clean the set of substrates W with the rinse liquid. As a result, the rinse liquid collects in the processing tank. After the cleaning with the rinse liquid, the rinse liquid in the processing tank is discharged.

After rinse liquid discharge, the etching solution is supplied into the processing tank. As a result, the etching solution is reserved in the processing tank. Once the etching solution is reserved in the processing tank, the sub-transport mechanism LF1 moves the set of substrates W into the processing tank. As a result, the set of substrates W is immersed in the etching solution in the processing tank to be etched. Thereafter, the sub-transport mechanism LF1 pulls the set of substrates W out of the etching solution in the processing tank and brings the set of substrates W out of the second chemical liquid tank ONB1. The etching solution in the processing tank is discharged from the processing tank after the set of substrates W is pulled out of the etching solution.

The second chemical liquid tanks ONB2 to ONB4 and the sub-transport mechanisms LF3, LF5, and LF6 operate in the same manner as the second chemical liquid tank ONB1 and the sub-transport mechanism LF1. Therefore, description thereof is omitted.

In the present embodiment, the DIW use plan described with reference to FIG. 2 indicates rinse liquid discharge timings in the respective second chemical liquid tanks ONB1 to ONB4 (timings when the respective shower nozzle are used) and flow rates of the pure water DIW used in respective rinse liquid discharges. As such, the time schedule P described with reference to FIG. 2 indicates timings when the shower nozzles are used in the respective second chemical liquid tanks ONB1 to ONB4 and flow rates of the pure water DIW used in respective rinse liquid discharges. Here, the rinse liquid discharge timings each indicate a time at which rinse liquid discharge starts and a time at which the rinse liquid discharge ends. That is, the rinse liquid discharge timings each indicate a period from a start to an end of rinse liquid discharge.

Furthermore, the DIW use plan described with reference to FIG. 2 indicates timings when the etching solution is supplied to the processing tanks of the respective second chemical liquid tanks ONB1 to ONB4 and flow rates of the pure water DIW used in respective etching solution supplies. As such, the time schedule P described with reference to FIG. 2 indicates timings when the etching solution is supplied to the processing tanks of the respective second chemical liquid tanks ONB1 to ONB4 and flow rates of the pure water DIW used in respective etching solution supplies. Here, the timings when the etching solution is supplied each indicate a time at which etching solution supply to a corresponding processing tank starts and a time at which the etching solution supply to the processing tank ends. That is, the timings when the etching solution is supplied each indicate a period from a start to an end of etching solution supply to the corresponding processing tank.

The second chemical liquid tanks ONB1 to ONB4 each further include an ultrasonic generator likewise the first chemical liquid tanks CHB1 and CHB2. In the present embodiment, the DIW use plan described with reference to FIG. 2 indicates timings when the propagation water DIW is used in the respective second chemical liquid tanks ONB1 to ONB4 and flow rates of the propagation water DIW in the respective second chemical liquid tanks ONB1 to ONB4. As such, the time schedule P described with reference to FIG. 2 indicates timings when the propagation water DIW is used in the respective second chemical liquid tanks ONB1 to ONB4 and flow rates of the propagation water DIW in the respective second chemical liquid tanks ONB1 to ONB4.

The drying tanks LPD1 and LPD2 perform drying on the set of substrates W. In detail, the drying tanks LPD1 and LPD2 each include a gas nozzle and a processing tank.

The gas nozzle ejects steam of an organic solvent toward the set of substrates W located above the processing tank. This can dry the set of substrates W. The steam of the organic solvent is steam of isopropyl alcohol (IPA), for example. The processing tank reserves the pure water DIW. The set of substrates W is immersed in the pure water DIW in the processing tank to be rinsed.

The second transport mechanism WTR brings the set of substrates W into the drying tank LPD1 to immerse the set of substrates W in the pure water DIW reserved in the processing tank. As a result, the set of substrates W is rinsed. Thereafter, the second transport mechanism WTR pulls the set of substrates W out of the pure water DIW in the processing tank. Once the set of substrates W is pulled out of the pure water DIW in the processing tank, the pure water DIW is discharged from the processing tank. After discharge of the pure water DIW from the processing tank, steam of the organic solvent is ejected from the gas nozzle. As a result, the set of substrates W is dried. The second transport mechanism WTR brings the set of dried substrates W out of the drying tank LPD1.

The operation of the drying tank LPD2 and the operation of the second transport mechanism WTR with respect to the drying tank LPD2 are the same as the operation of the drying tank LPD1 and the operation of the second transport mechanism WTR with respect to the drying tank LPD1, respectively. Therefore, description thereof is omitted.

The pure water DIW is supplied to the processing tanks of the drying tanks LPD1 and LPD2 before the second transport mechanism WTR brings the set of substrates W into the drying tanks LPD1 and LPD2. The DIW use plan described with reference to FIG. 2 indicates timings when the pure water DIW is supplied to the processing tanks of the respective drying tanks LPD1 and LPD2 and flow rates of the pure water DIW supplied to the processing tanks of the respective drying tanks LPD1 and LPD2 in the present embodiment. As such, the time schedule P described with reference to FIG. 2 indicates timings when the pure water DIW is supplied to the processing tanks of the respective drying tanks LPD1 and LPD2 and flow rates of the pure water DIW supplied to the processing tanks of the respective drying tanks LPD1 and LPD2. Here, the timings when the pure water DIW is supplied each indicate a time at which supply of the pure water DIW to a corresponding processing tank starts and a time at which the supply of the pure water DIW to the processing tank ends. That is, the timings when the pure water DIW is supplied each indicate a period from a start to an end of supply of the pure water DIW to the corresponding processing tank.

The substrate processing apparatus 1 will be further described next with reference to FIG. 5. As illustrated in FIG. 5, the substrate processing apparatus 1 further includes a cleaning tank CHCL. The cleaning CHCL cleans the second transport mechanism WTR. In the present embodiment, a hand of the second transport mechanism WTR is cleaned with the pure water DIW in the cleaning tank CHCL. The substrate processing apparatus 1 uses the pure water DIW in cleaning the second transport mechanism WTR.

In the present embodiment, the DIW use plan described with reference to FIG. 2 indicates a timing when the second transport mechanism WTR is cleaned and a flow rate of the pure water DIW used in cleaning of the second transport mechanism WTR. As such, the time schedule P described with reference to FIG. 2 indicates a timing when the second transport mechanism WTR is cleaned and a flow rate of the pure water DIW used in cleaning of the second transport mechanism WTR.

More specifically, the cleaning tank CHCL includes a shower nozzle and a processing tank. The shower nozzle ejects droplets of the pure water DIW toward the hand of the second transport mechanism WTR located above the processing tank. The pure water DIW is reserved in the processing tank. The hand of the second transport mechanism WTR is immersed in the pure water DIW in the processing tank. The DIW use plan described with reference to FIG. 2 indicates a timing when the pure water DIW is ejected in the cleaning tank CHCL (timing when the shower nozzle is used) and a flow rate of the pure water DIW used in ejection of the pure water DIW. Furthermore, the DIW use plan described with reference to FIG. 2 indicates a timing when the pure water DIW is supplied to the processing tank of the cleaning tank CHCL and a flow rate of the pure water DIW used in supply of the pure water DIW.

The computer CM1 of the substrate processing apparatus 1 will be described next with reference to FIG. 6. FIG. 6 is a block diagram of a configuration of the computer CM1 of a substrate processing apparatus 1 included in the substrate processing system 100 of the present embodiment. As illustrated in FIG. 6, the computer CM1 includes a communication section 51, storage 52, and a controller 53. In the following, the communication section 51 of the substrate processing apparatus 1 may be referred to as "first communication section 51". Also, the storage 52 of the substrate processing apparatus 1 may be referred to as "first storage 52".

The first communication section 51 is wired or connected wirelessly to the network NW. The network NW includes the Internet, a local area network (LAN), and a public telephone network, for example. The first communication section 51 is a communication tool and may be a network interface controller, for example. The first communication section 51 performs communication with the group management device 2 connected to the network NW.

The first communication section 51 transmits the DIW use plan described with reference to FIG. 2 to the group management device 2. In the present embodiment, the first communication section 51 transmits the time schedule P described with reference to FIG. 2 to the group management device 2. Furthermore, the first communication section 51 receives the readjustment instruction RA described with reference to FIG. 3 from the group management device 2. The first communication section 51 also receives the management information ASC from the group management device 2 as described with reference to FIG. 4.

The first storage 52 stores various data and various computer programs therein. The various data includes recipe data. The recipe data indicates a plurality of recipes. Each of the recipes defines processing details and processing procedures for the substrates W, for example. For example, each of the recipes defines a timing when the processing liquid is used in substrate processing by the processing unit SP and a flow rate per unit time of the processing liquid. The timing when the processing liquid is used indicates a time at which use of the processing liquid starts and a time at which the use of the processing liquid ends. That is, the timing when the processing liquid is used indicates a period from a start to an end of use of the processing liquid. The flow rate per unit time of the processing liquid indicates an amount of use per unit time of the processing liquid.

The first storage 52 includes a main storage device. The main storage device is semiconductor memory, for example. The first storage 52 further includes an auxiliary storage device. The auxiliary storage device includes at least one of semiconductor memory and a hard disk drive, for example. The first storage 52 may include a removable medium.

The controller 53 includes a processor. The controller 53 includes as the processor a central processing unit (CPU) or a micro processing unit (MPU), for example. The controller 53 controls operation of each element of the substrate processing apparatus 1 based on the computer programs and the data stored in the first storage 52.

Furthermore, the controller 53 creates the DIW use plan described with reference to FIG. 2 based on the recipe data stored in the first storage 52. The controller 53 causes the first communication section 51 to perform transmission of the created DIW use plan. In the present embodiment, the controller 53 creates the time schedule P described with reference to FIG. 2 based on the recipe data and causes the first communication section 51 to perform transmission of the time schedule P. The controller 53 is an example of a "plan creating section".

Furthermore, upon receiving the readjustment instruction RA and the management information ASC via the first communication section 51, the controller 53 creates a DIW use plan (time schedule P) that causes the total DIW flow rate to be equal to or lower than the threshold value TH by referring to the management information ASC. In detail, the controller 53 adjusts the DIW use plan (time schedule P) of the substrate processing apparatus 1 by referring to the DIW use plans (time schedules P) of the other substrate processing apparatuses 1 installed in the same area A as described with reference to FIG. 4. Furthermore, the controller 53 repeats update (adjustment) of the DIW use plan (time schedule P) to create a DIW use plan (time schedule P) that causes the DIW total flow rate to be equal tor lower than the threshold value TH as described with reference to FIG. 4.

Figure 7:
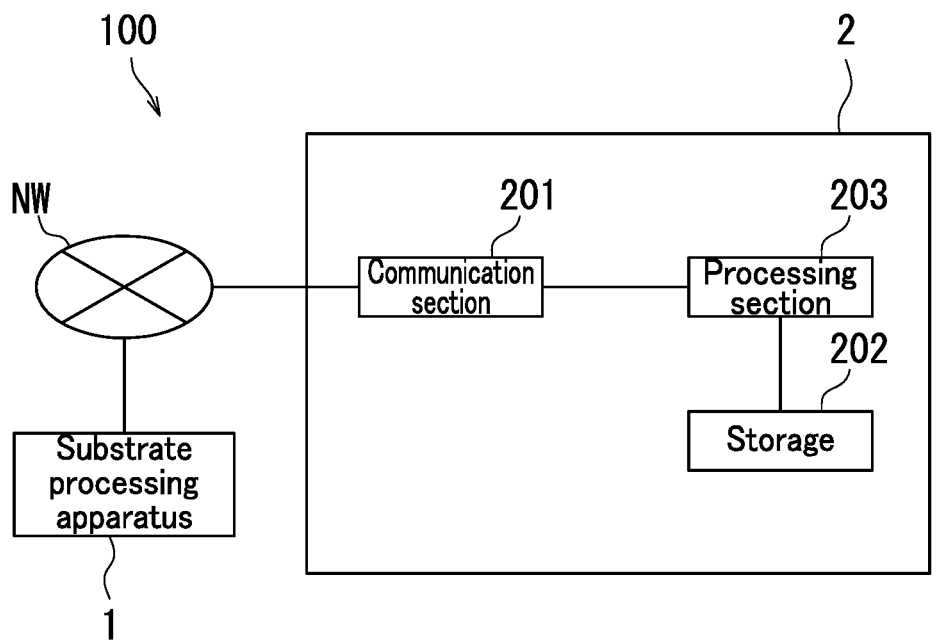
FIG. 7 is a block diagram of the configuration of a group management device included in the substrate processing system in the embodiment.

The group management device 2 will be described next with reference to FIG. 7. FIG. 7 is a block diagram of the configuration of the group management device 2 included in the substrate processing system 100 of the present embodiment. As illustrated in FIG. 7, the group management device 2 includes a communication section 201, storage 202, and a processing section 203. In the following, the communication section 201 of the group management device 2 may be referred to as "second communication section 201". Also, the storage 202 of the group management device 2 may be referred to as "second storage 202".

The second communication section 201 is wired or connected wirelessly to the network NW. The second communication section 201 is a communication tool and may be a network interface controller, for example. The second communication section 201 performs communication with each substrate processing apparatus 1 connected to the network NW.

The second communication section 201 receives the DIW use plan described with reference to FIG. 2 from each of the substrate processing apparatuses 1. In the present embodiment, the second communication section 201 receives the time schedule P described with reference to FIG. 2 from each of the substrate processing apparatuses 1. Furthermore, the second communication section 201 transmits the readjustment instruction RA described with reference to FIG. 3 to the instruction target apparatus. Furthermore, the second communication section 201 transmits the management information ASC to the instruction target apparatus as described with reference to FIG. 4.

The second storage 202 stores various data and various computer programs therein. Each of the various data includes the threshold value TH described with reference to FIG. 3. More specifically, the second storage 202 stores therein a threshold value TH of each resource system PF. The second storage 202 includes a main storage device. The main storage device is semiconductor memory, for example. The second storage 202 further includes an auxiliary storage device. The auxiliary storage device includes at least one of semiconductor memory and a hard disk drive, for example. The second storage 202 may include a removable medium.

The processing section 203 includes a processor. The processing section 203 includes a CPU or a MPU as the processor, for example. The processing section 203 executes various processing based on the computer programs and the data stored in the second storage 202. Specifically, the processing section 203 generates the total flow rate information AFR and the management information ASC described with reference to FIG. 2. Furthermore, the processing section 203 executes the threshold determination processing and the determination processing described with reference to FIG. 3. Moreover, the processing section 203 transmits the readjustment instruction RA and the management information ASC to the instruction target apparatus via the second communication section 201 as described with reference to FIGS. 3 and 4.

Figure 8:
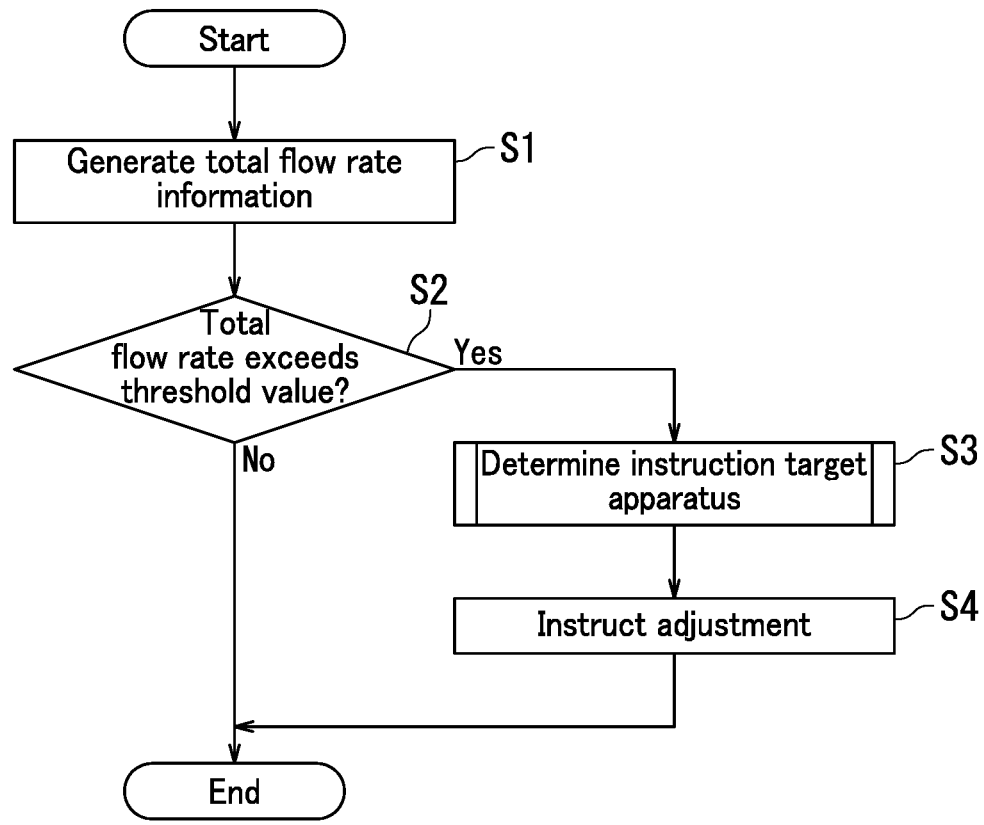
FIG. 8 is a flowchart depicting a flow of processing executed by a processing section of the group management device included in the substrate processing system in the embodiment.

Processing executed by the processing section 203 of the group management device 2 will be described next with reference to FIG. 8. FIG. 8 is a flowchart depicting a flow of processing executed by the processing section 203 of the group management device 2 included in the substrate processing system 100 of the present embodiment. The processing depicted in FIG. 8 starts in response to the second communication section 201 receiving a DIW use plan (time schedule P). For the sake of easy understanding, the processing depicted in FIG. 8 will be described below using a case with the substrate processing apparatuses 1A to 1D described with reference to FIGS. 1 to 4 as an example.

As depicted in FIG. 8, when the second communication section 201 receives the DIW use plan of one of the substrate processing apparatuses 1A to 1D, the processing section 203 acquires the total DIW flow rate in the first area A1 based on the DIW use plans received from the substrate processing apparatuses 1A to 1D, and generates total flow rate information AFR of the first area A1 (Step S1). More specifically, upon the second communication section 201 receiving the DIW use plan (time schedule P) of one of the substrate processing apparatuses 1A to 1D, the processing section 203 determines whether or not all the DIW use plans (time schedules P) of the substrate processing apparatuses 1A to 1D have been received. When it is determined that all the DIW use plans (time schedules P) of the substrate processing apparatuses 1A to 1D have been received, the processing section 203 combines the DIW use plans (time schedules P) of the substrate processing apparatuses 1A to 1D to generate management information ASC of the first area A1. Subsequently, the processing section 203 generates total flow rate information AFR in the first area A1 based on the generated management information ASC.

After generating the total flow rate information AFR in the first area A1, the processing section 203 determines whether or not the DIW total flow rate in the first area A1 exceeds the threshold value TH based on the total flow rate information AFR and the threshold value TH (Step S2).

If the processing section 203 determines that the DIW total flow rate in the first area A1 does not exceeds the threshold value TH (No in Step S2), the processing depicted in FIG. 8 ends. If the processing section 203 determines that the DIW total flow rate in the first area A1 exceeds the threshold value TH by contrast (Yes in Step S2), the processing section 203 determines one of the substrate processing apparatuses 1A to 1D to be an instruction target apparatus (Step S3). Thereafter, the processing section 203 instructs the instruction target apparatus to adjust the DIW use plan of the instruction target apparatus via the second communication section 201 (Step S4). The processing depicted in FIG. 8 ends then.

More specifically, the processing section 203 specifies based on the management information ASC a substrate processing apparatus 1 that uses the pure water DIW in a time zone during which the DIW total flow rate exceeds the threshold value TH. The processing section 203 determines (determination processing) one of the substrate processing apparatuses 1 that uses the pure water DIW in the time zone during which the DIW total flow rate exceeds the threshold value TH to be the instruction target apparatus based on a prescribed condition. After execution of the determination processing, the processing section 203 transmits the readjustment instruction RA to the instruction target apparatus via the second communication section 201.

In transmission of the readjustment instruction, the processing section 203 transmits to the instruction target apparatus the management information ASC of the first area A1 (area A in which the instruction target apparatus is installed) via the second communication section 201 in the present embodiment. As a result of transmission, the DIW use plans (time schedules P) of the other substrate processing apparatuses 1 installed in the first area A1 (area A in which the instruction target apparatus is installed) are transmitted to the instruction target apparatus.

Figure 9:
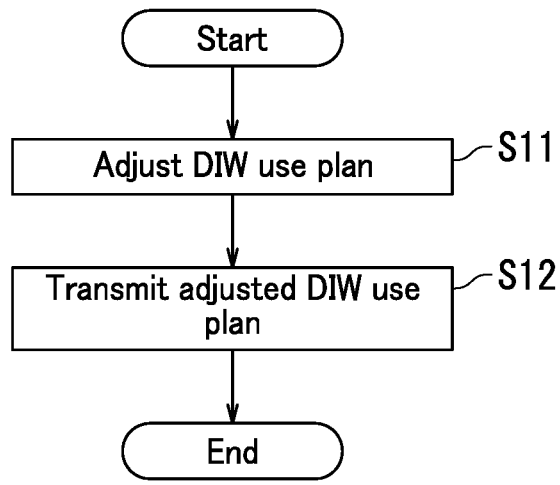
FIG. 9 is a flowchart depicting a flow of processing executed by a controller of the computer of the substrate processing apparatus included in the substrate processing system in the embodiment.

Processing executed by the controller 53 of the computer CM1 included in a substrate processing apparatus 1 will be described next with reference to FIG. 9. FIG. 9 is a flowchart depicting a flow of the processing executed by the controller 53 of the computer CM1 of the substrate processing apparatus 1 included in the substrate processing system 100 of the present embodiment. The processing depicted in FIG. 9 starts in response to the first communication section 51 receiving the readjustment instruction RA. That is, the processing depicted in FIG. 9 indicates a flow of the processing executed by the controller 53 of the instruction target apparatus. For the sake of easy understanding, the processing depicted in FIG. 9 will be described below using as an example a case in which the substrate processing apparatus 1B described with reference to FIGS. 1 to 4 is determined to be the instruction target apparatus.

As depicted in FIG. 9, upon the first communication section 51 receiving the readjustment instruction RA, the controller 53 adjusts the DIW use plan (time schedule P) (Step S11). In the present embodiment, the controller 53 adjusts the DIW use plan (time schedule P) by referring to the management information ASC. Specifically, the controller 53 adjusts the DIW use plan (time schedule P) of the substrate processing apparatus 1B by referring to the DIW use plans (time schedules P) of the other substrate processing apparatuses (substrate processing apparatuses 1A, 1C, and 1D) installed in the first area A1.

After adjustment of the DIW use plan (time schedule P), the controller 53 transmits the adjusted DIW use plan (time schedule P) to the group management device 2 via the first communication section 51 (Step S12). The processing depicted in FIG. 9 ends then. Note that the processing section 203 of the group management device 2 starts the processing described with reference to FIG. 8 upon receiving the adjusted DIW use plan (time schedule P). However, a process of determining the instruction target apparatus (Step S3) may be omitted in the processing depicted in FIG. 8.

The determination processing (Step S3 in FIG. 8) executed by the processing section 203 of the group management device 2 will be described next with reference to FIGS. 10 to 15. For the sake of easy understanding, the determination processing will be described below using a case with the substrate processing apparatuses 1A to 1D described with reference to FIGS. 1 to 4 as an example.

Figure 10:
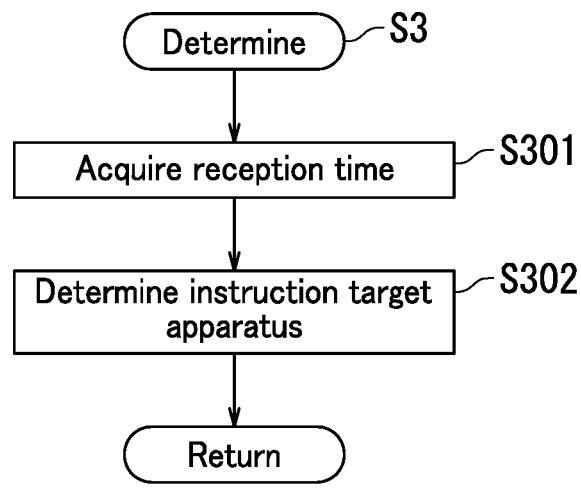
FIG. 10 is a diagram illustrating a first example of determination processing.

FIG. 10 is a flowchart depicting a first example of the determination processing. In the first example of the determination processing, the processing section 203 determines an instruction target apparatus based on timings when the respective substrate processing apparatuses 1 transmit the DIW use plans (time schedules P) to the group management device 2. In the following, a timing when a substrate processing apparatus 1 transmits a DIW use plan (time schedules P) of the substrate processing apparatus 1 to the group management device 2 may be referred to as "transmission timing".

Specifically, as depicted in FIG. 10, when it is determined that the DIW total flow rate in the first area A1 exceeds the threshold value TH (Yes in Step S2 in FIG. 8), the processing section 203 acquires reception times at which the second communication section 201 receives DIW use plans (DIW use plans before being adjusted) from the respective substrate processing apparatuses 1A to 1D (Step S301). In detail, each time the second communication section 201 receives a DIW use plan (time schedule P), the processing section 203 stores a reception time (time at which the DIW use plan before adjustment is received) of the DIW use plan (time schedule P) in the second storage 202. The processing section 203 acquires the reception times from the second storage 202.

The processing section 203 determines one of the substrate processing apparatuses 1A to 1D to be an instruction target apparatus based on the reception times at which the DIW use plans have been received from the respective substrate processing apparatuses 1A to 1D (Step S302). The processing depicted in FIG. 10 ends then.

For example, the processing section 203 may determine a substrate processing apparatus 1 of the substrate processing apparatuses 1A to 1D that has the latest transmission timing to be an instruction target apparatus. That is, the processing section 203 may determine a substrate processing apparatus 1 of the substrate processing apparatuses 1A to 1D that has the latest reception time at which the DIW use plan has been received to be an instruction target apparatus. In the above configuration, substrate processing by a substrate processing apparatus 1 of the substrate processing apparatuses 1A to 1D that has a relatively early timing when the time schedule P is created can be executed with priority. As a result, decrease in throughput of the substrate processing apparatus 1 with a relatively early timing when the time schedule P is created can be inhibited.

Alternatively, the processing section 203 may determine a substrate processing apparatus 1 of the substrate processing apparatuses 1A to 1D that has the earliest transmission timing to be an instruction target apparatus. That is, the processing section 203 may determine a substrate processing apparatus 1 of the substrate processing apparatuses 1A to 1D that has the earliest reception time at which the DIW use plan is received to be an instruction target apparatus. In the above configuration, decrease in throughput by a substrate processing apparatus 1 of the substrate processing apparatuses 1A to 1D that has a relatively late timing when the time schedule P is created can be inhibited. As a result, throughputs in the area A in which the instruction target apparatus is installed can be averaged.

Figure 11:
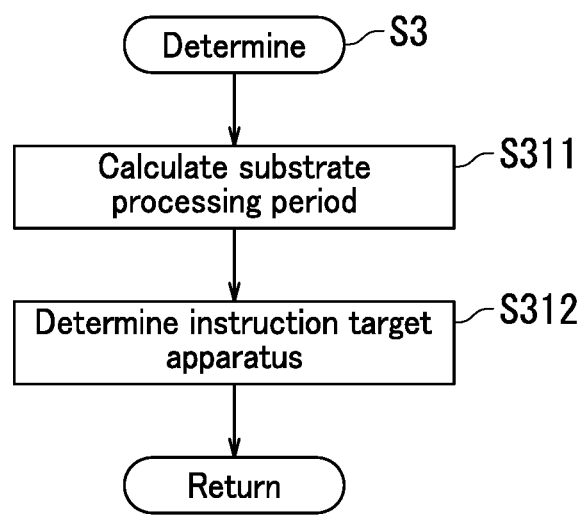
FIG. 11 is a diagram illustrating a second example of the determination processing.

FIG. 11 is a flowchart depicting a second example of the determination processing. In the second example of the determination processing, the processing section 203 determines an instruction target apparatus based on substrate processing periods. The substrate processing periods each include a time at which the substrates W are brought into a corresponding substrate processing apparatus 1 from the outside and a time at which the substrates W are brought out of the substrate processing apparatus 1. In detail, the substrate processing periods each are a period from a time at which substrates W loaded on the load ports LP of a corresponding substrate processing apparatus 1 are brought into the substrate processing apparatus 1 to a time at which the substrates W are processed in the substrate processing apparatus 1 and loaded on other load ports LP of the substrate processing apparatus 1.

In the substrate processing apparatus 1 illustrated in FIG. 5, the substrate processing period is a period from a time at which two accommodation sections 10 are brought into the buffer unit BU from the input section 3 to a time at which non-processed substrates W (a set of substrates W) taken out of the two accommodation sections 10 are processed by the processing unit SP, the processed substrates W (the set of substrates W) are accommodated in two accommodation sections 10, and the two accommodation sections 10 accommodating the processed substrates W are output to the output section 7.

Specifically, as depicted in FIG. 11, when it is determined that the DIW total flow rate in the first area A1 exceeds the threshold value TH (Yes in Step S2 in FIG. 8), the processing section 203 calculates substrate processing periods based on the time schedules P (management information ASC) of the substrate processing apparatuses 1A to 1D (Step S311). Thereafter, the processing section 203 determines one of the substrate processing apparatuses 1A to 1D to be an instruction target apparatus based on the substrate processing periods (Step S312). The processing depicted in FIG. 11 ends then.

For example, the processing section 203 may determine a substrate processing apparatus 1 of the substrate processing apparatuses 1A to 1D that has the shortest substrate processing period to be an instruction target apparatus. In the above configuration, throughputs in an area A in which the instruction target apparatus is installed can be averaged.

Alternatively, the processing section 203 may determine a substrate processing apparatus 1 of the substrate processing apparatuses 1A to 1D that has the longest substrate processing period to be an instruction target apparatus. In the above configuration, substrate processing by a substrate processing apparatus 1 of the substrate processing apparatuses 1A to 1D that has a relatively short substrate processing period can be executed with priority. As a result, decrease in throughput of a substrate processing apparatus 1 with a relatively short substrate processing period can be inhibited.

Figure 12:
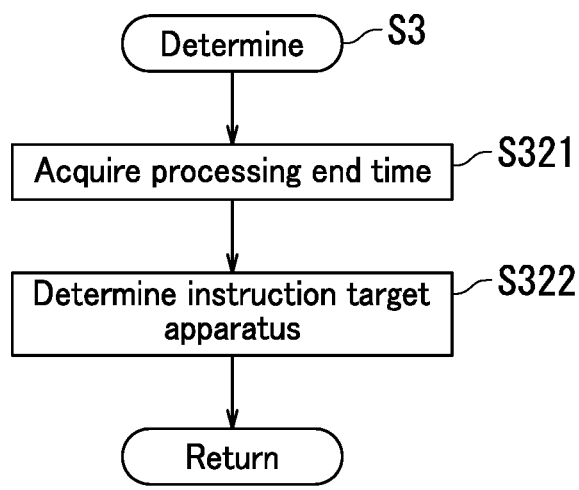
FIG. 12 is a diagram illustrating a third example of the determination processing.

FIG. 12 is a flowchart depicting a third example of the determination processing. In the third example of the determination processing, the processing section 203 determines an instruction target apparatus based on processing end timings when processing on the substrates W ends. The processing end timing in the substrate processing apparatus 1 illustrated in FIG. 5 is a timing when a set of substrates W processed by the processing unit SP is accommodated in two accommodation sections 10.

Specifically, as depicted in FIG. 12, upon determination that the DIW total flow rate in the first area A1 exceeds the threshold value TH (Yes in Step S2), the processing section 203 acquires processing end times from the time schedules P (management information ASC) of the substrate processing apparatuses 1A to 1D (Step S321). In the substrate processing apparatus illustrated in FIG. 5, the processing end time is a time at which a set of substrates W processed by the processing unit SP is accommodated in two accommodation sections 10.

The processing section 203 determines one of the substrate processing apparatuses 1A to 1D to be an instruction target apparatus based on the processing end times (Step S322). The processing depicted in FIG. 12 ends then.

For example, the processing section 203 may determine a substrate processing apparatus 1 of the substrate processing apparatuses 1A to 1D that has the latest processing end timing (processing end time) to be an instruction target apparatus. In the above configuration, substrate processing by a substrate processing apparatus 1 of the substrate processing apparatuses 1A to 1D that has a relatively early processing end timing (processing end time) can be executed with priority. As a result, decrease in throughput of the substrate processing apparatus 1 with a relatively early processing end timing (processing end time) can be inhibited.

Alternatively, the processing section 203 may determine a substrate processing apparatus 1 of the substrate processing apparatuses 1A to 1D that has the earliest processing end timing (processing end time) to be an instruction target apparatus. In the above configuration, throughputs in an area A in which the instruction target apparatus is installed can be averaged.

Figure 13:
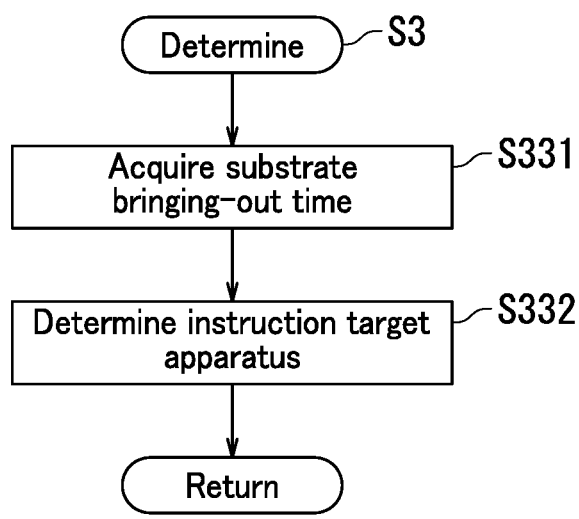
FIG. 13 is a diagram illustrating a fourth example of the determination processing.

FIG. 13 is a flowchart depicting a fourth example of the determination processing. In the fourth example of the determination processing, the processing section 203 determines an instruction target apparatus based on substrate bringing-out timings when substrates W are brought out of the respective substrate processing apparatuses 1. Specifically, the substrate bringing-out timings each are a timing when processed substrates W are loaded on the load ports LP of a corresponding substrate processing apparatus 1. The substrate bringing-out timing in the substrate processing apparatus 1 illustrated in FIG. 5 is a timing when two accommodation sections 10 accommodating a set of substrates W processed by the processing unit SP are output to the output section 7.

Specifically, as illustrated in FIG. 13, when it is determined that the DIW total flow rate in the first area A1 exceeds the threshold value TH (Yes in Step S2 in FIG. 8), the processing section 203 acquires substrate bringing-out times from the time schedules P (management information ASC) of the substrate processing apparatuses 1A to 1D (Step S331). In the substrate processing apparatus illustrated in FIG. 5, the substrate bringing-out time is a time at which two accommodation sections 10 accommodating a set of substrates W processed by the processing unit SP are output to the output section 7.

The processing section 203 determines one of the substrate processing apparatuses 1A to 1D to be an instruction target apparatus based on the substrate bringing-out times (Step S332). The processing depicted in FIG. 13 ends then.

For example, the processing section 203 may determine a substrate processing apparatus 1 of the substrate processing apparatuses 1A to 1D that has the latest substrate bringing-out timing (substrate bringing-out time) to be an instruction target apparatus. In the above configuration, substrate processing by a substrate processing apparatus 1 of the substrate processing apparatuses 1A to 1D that has a relatively earlier substrate bringing-out timing (substrate bringing-out time) can be executed with priority. As a result, decrease in throughput of the substrate processing apparatus 1 with a relatively earlier substrate bringing-out timing (substrate bringing-out time) can be inhibited.

Alternatively, the processing section 203 may determine a substrate processing apparatus 1 of the substrate processing apparatuses 1A to 1D that has the earliest substrate bringing-out timing (substrate bringing-out time) to be an instruction target apparatus. In the above configuration, throughputs in an area A in which the instruction target apparatus is installed can be averaged.

Figure 14:
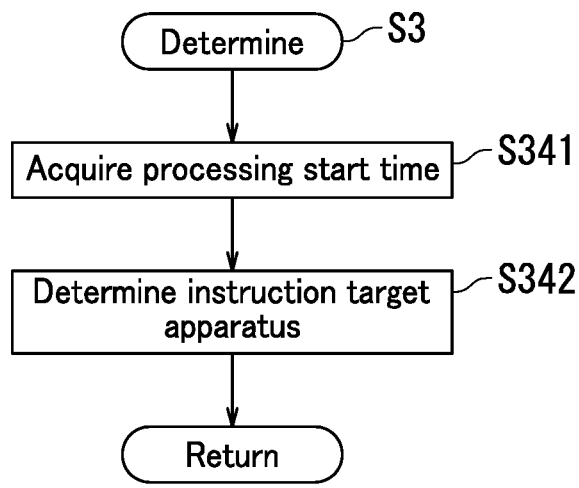
FIG. 14 is a diagram illustrating a fifth example of the determination processing.

FIG. 14 is a flowchart depicting a fifth example of the determination processing. In the fifth example of the determination processing, the processing section 203 determines an instruction target apparatus based on processing start timings when processing on the substrates W starts. The processing start timing in the substrate processing apparatus 1 illustrated in FIG. 5 is a timing when processing of combining two lots of non-processed substrates W into a set starts.

Specifically, as depicted in FIG. 14, when it is determined that the DIW total flow rate in the first area A1 exceeds the threshold value TH (Yes in Step S2 in FIG. 8), the processing section 203 acquires the processing start times from the time schedules P (management information ASC) of the substrate processing apparatuses 1A to 1D (Step S341). The processing start time in the substrate processing apparatus 1 illustrated in FIG. 5 is a time when processing of combining two lots of non-processed substrates W into a set starts.

The processing section 203 determines one of the substrate processing apparatuses 1A to 1D to be an instruction target apparatus based on the processing start times (Step S342). The processing depicted in FIG. 14 ends then.

For example, the processing section 203 may determine a substrate processing apparatus 1 of the substrate processing apparatuses 1A to 1D that has the latest processing start timing (processing start time) to be an instruction target apparatus. In the above configuration, substrate processing by a substrate processing apparatus 1 of the substrate processing apparatuses 1A to 1D that has a relatively early processing start timing (processing start time) can be executed with priority. As a result, decrease in throughput of the substrate processing apparatus 1 with a relatively early processing start timing (processing start time) can be inhibited.

Alternatively, the processing section 203 may determine a substrate processing apparatus 1 of the substrate processing apparatuses 1A to 1D that has the earliest processing start timing (processing start time) to be an instruction target apparatus. In the above configuration, throughputs in an area A in which the instruction target apparatus is installed can be averaged.

Figure 15:
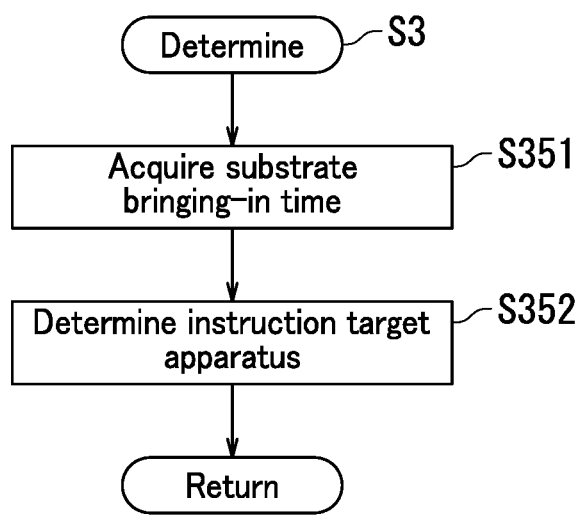
FIG. 15 is a diagram illustrating a sixth example of the determination processing.

FIG. 15 is a flowchart depicting a sixth example of the determination processing. In the sixth example of the determination processing, the processing section 203 determines an instruction target apparatus based on substrate bringing-in timings when substrates W are brought into the substrate processing apparatuses 1 from the outside. In detail, the substrate bringing-in timings each are a timing when substrates W loaded on the load ports LP of a corresponding substrate processing apparatus 1 are bright into the substrate processing apparatus 1. The substrate bringing-in timing in the substrate processing apparatus 1 illustrated in FIG. 5 is a timing when accommodation sections 10 are input to the buffer unit BU from the input section 3. In detail, a substrate bringing-in timing corresponds to an earlier one of two input timings when the respective two accommodation sections 10 accommodating substrates W to be combined into a set of the substrates W are input.

Specifically, as depicted in FIG. 15, when it is determined that the DIW total flow rate in the first area A1 exceeds the threshold value TH (Yes in Step S2 in FIG. 8), the processing section 203 acquires substrate bringing-in times from the time schedules P (management information ASC) of the substrate processing apparatuses 1A to 1D (Step S351). The substrate bringing-in time in the substrate processing apparatus 1 illustrated in FIG. 5 is a time at which accommodation sections 10 are input into the buffer unit BU from the input section 3. In detail, the substrate bringing-in time corresponds to an earlier one of two input times at which the respective two accommodation sections 10 accommodating substrates W to be combined into a set of the substrates W are input.

The processing section 203 determines one of the substrate processing apparatuses 1A to 1D to be an instruction target apparatus based on the substrate bringing-in times (Step S352). The processing depicted in FIG. 15 ends then.

For example, the processing section 203 may determine a substrate processing apparatus 1 of the substrate processing apparatuses 1A to 1D that has the latest substrate bringing-in timing (substrate bringing-in time) to be an instruction target apparatus. In the above configuration, substrate processing by a substrate processing apparatus 1 of the substrate processing apparatuses 1A to 1D that has a relatively earlier substrate bringing-in timing (substrate bringing-in time) can be executed with priority. As a result, decrease in throughput of the substrate processing apparatus 1 with a relatively early substrate bringing-in timing (substrate bringing-in time) can be inhibited.

Alternatively, the processing section 203 may determine a substrate processing apparatus 1 of the substrate processing apparatuses 1A to 1D that has the earliest substrate bringing-in timing (substrate bringing-in time) to be an instruction target apparatus. In the above configuration, throughputs in an area A in which the instruction target apparatus is installed can be averaged.

Figure 16:
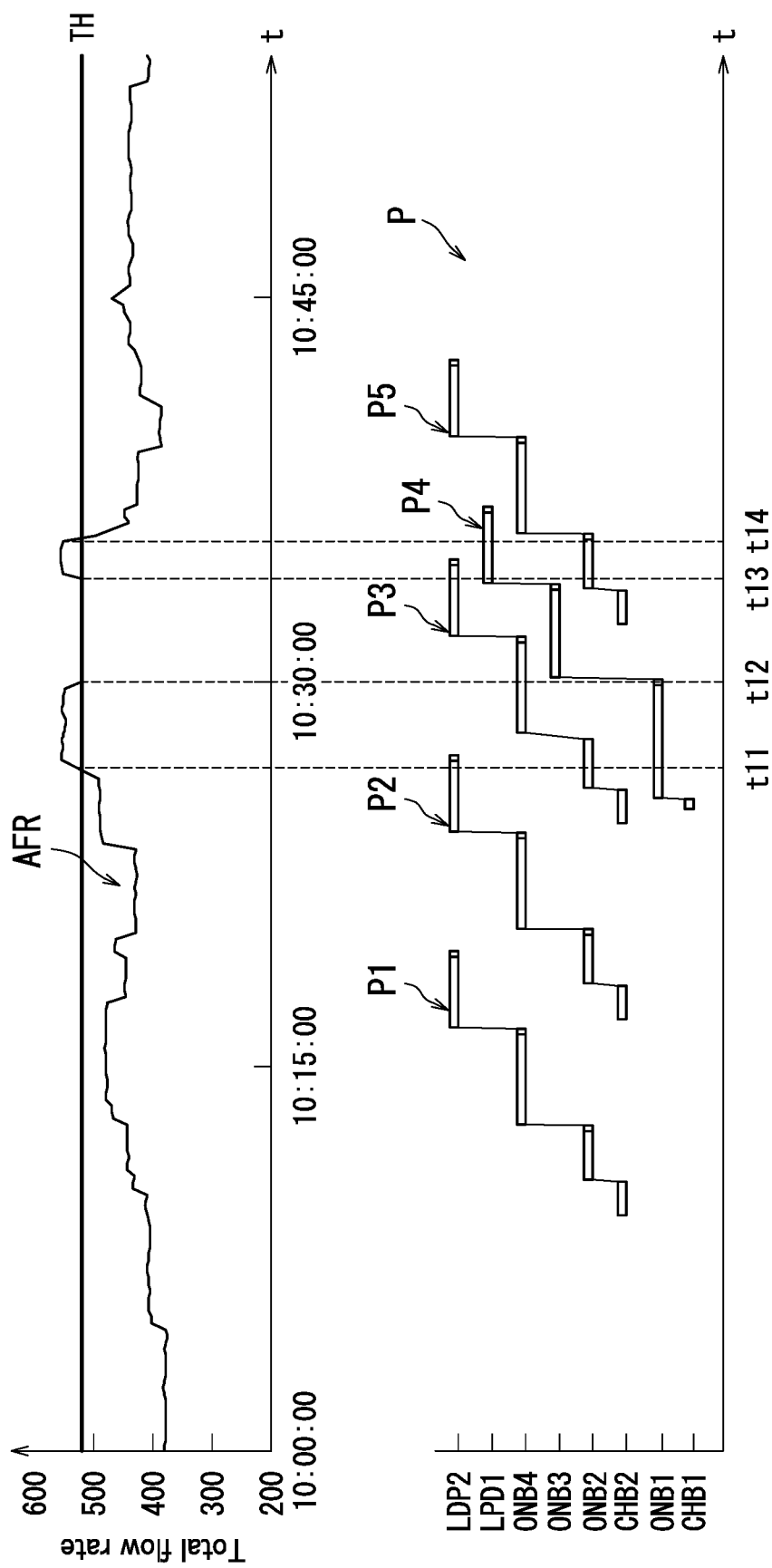
FIG. 16 is a diagram illustrating an example of a time schedule created by the controller of the substrate processing apparatus included in the substrate processing system in the embodiment.
Figure 17:
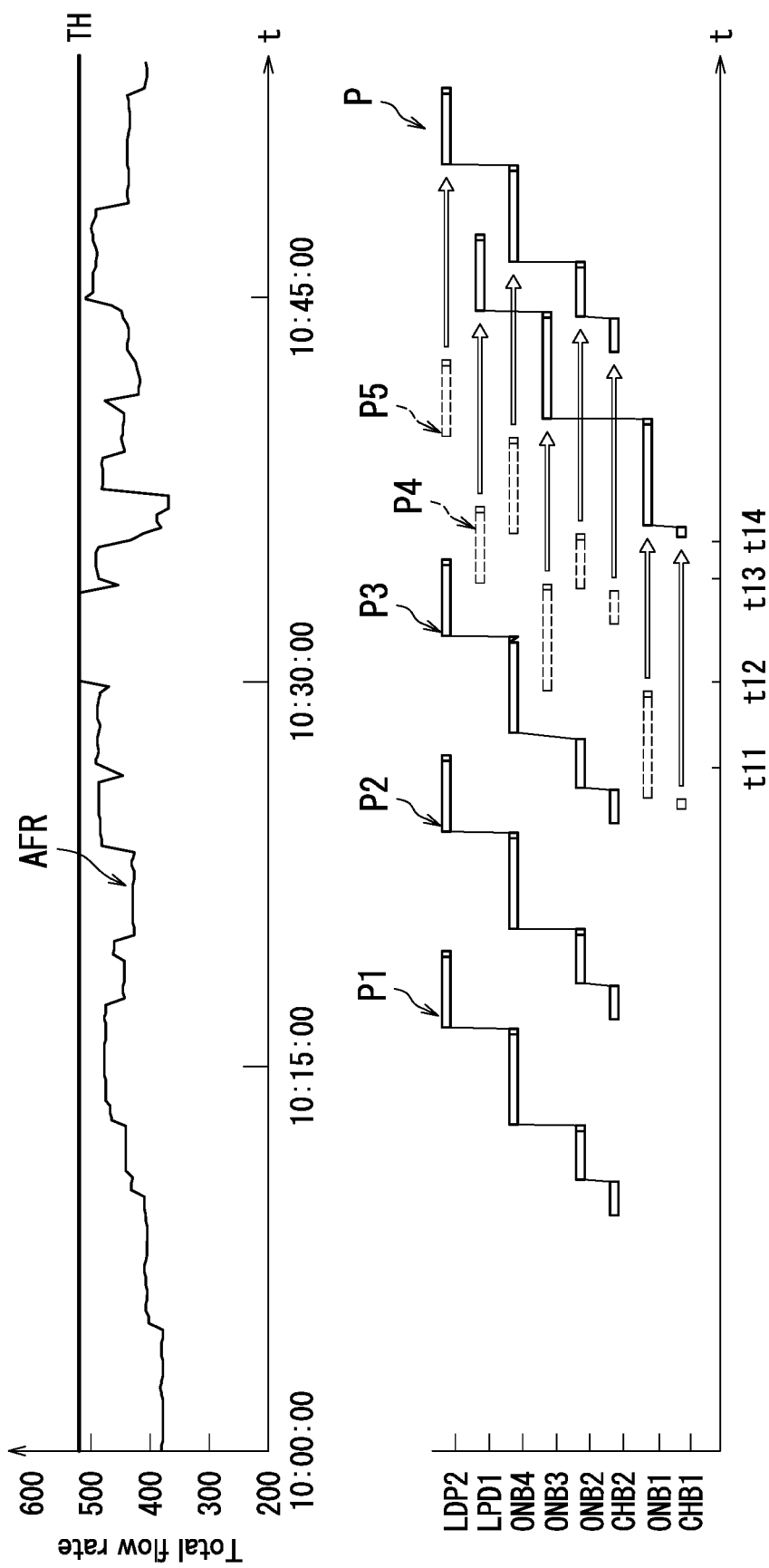
FIG. 17 is a diagram illustrating an example of an adjusted time schedule created by the controller of the substrate processing apparatus included in the substrate processing system in the embodiment.

The time schedule P created by the controller 53 of a substrate processing apparatus 1 will be described next with reference to FIGS. 16 and 17 using a case with the substrate processing apparatus 1B as an example. FIG. 16 is a diagram illustrating an example of the time schedule P created by the controller 53 of the substrate processing apparatus 1B included in the substrate processing system 100 of the present embodiment. FIG. 17 is a diagram illustrating an example of an adjusted time schedule P created by the controller 53 of the substrate processing apparatus 1B included in the substrate processing system 100 of the present embodiment. In each of FIGS. 16 and 17, the vertical axis indicates resources while the horizontal axis indicates time t. The resources are control targets on which the controller 53 performs control. The time schedules P illustrated in FIGS. 16 and 17 each include time schedules P1 to P5.

FIGS. 16 and 17 each further illustrate an example of the total flow rate information AFR generated by the processing section 203 of the group management device 2. In each of FIGS. 16 and 17, the vertical axis indicates the DIW total flow rate while the horizontal axis indicates time t.

The time schedules P1 to P5 each indicate a flow of processing on a set of substrates W. Specifically, the time schedules P1 to P3 and P5 each indicate a plan according to which a set of substrates W passes the first chemical liquid tank CHB2, the second chemical liquid tank ONB2, the second chemical liquid tank ONB4, and the drying tank LPD2 in the stated order. The time schedule P4 indicates a plan according to which a set of substrates W passes the first chemical liquid tank CHB1, the second chemical liquid tank ONB1, the second chemical liquid tank ONB3, and the drying tank LPD1 in the stated order. The flow of the processing defined in each of the time schedules P1 to P5 starts in the stated order.

In the example illustrated in FIG. 16, the DIW total flow rate exceeds the threshold value TH from time t11 to time t12 due to simultaneous execution of a part of the processing defined in the time schedule P3 and a part of the processing defined in the time schedule P4. The DIW total flow rate also exceeds the threshold value TH from time t13 to time t14 due to simultaneous execution of a part of the processing defined in the time schedule P3, a part of the processing defined in the time schedule P4, and a part of the processing defined in the time schedule P5. Once the substrate processing apparatus 1B is determined to be an instruction target apparatus, the controller 53 of the substrate processing apparatus 1B adjusts the time schedule P thereof.

In the example illustrated in FIG. 17, the controller 53 of the substrate processing apparatus 1B adjusts the time schedule P to delay the time schedules P4 and P5. Specifically, the controller 53 of the substrate processing apparatus 1B delays the time schedules P4 and P5 so that only the processing defined in the time schedule P3 is executed from time t11 to time t12. The controller 53 of the substrate processing apparatus 1B also delays the time schedules P4 and P5 so that only the processing defined in the time schedule P3 is executed from time t13 to time t14. As a result, the DIW total flow rate remains equal to or lower than the threshold value TH in all time as illustrated in FIG. 17.

Adjustment amount calculation processing executed by the controller 53 of a substrate processing apparatus 1 will be described next with reference to FIGS. 16 and 17 using a case with the substrate processing apparatus 1B as an example. The controller 53 of the substrate processing apparatus 1B calculates an adjustment amount for the time schedule P4 and the time schedule P5 based on the management information ASC so that the DIW total flow rate remains equal to or lower than the threshold value TH from time t11 to time t12. The adjustment amount is an amount of a shift of each of the time schedules P4 and P5 (DIW use plans) along the time axis. The controller 53 of the substrate processing apparatus 1B adjusts the time schedule P4 and the time schedule P5 based on the adjustment amount. That is, the controller 53 of the substrate processing apparatus 1B shifts the time schedule P4 and the time schedule P5 by the adjustment amount along the time axis.

Specifically, the controller 53 of the substrate processing apparatus 1B calculates as the adjustment amount a delay amount (delay time) by which the start time of the time schedule P4 is shifted to time t12 or later. The controller 53 of the substrate processing apparatus 1B creates a time schedule P in which the time schedule P4 and the time schedule P5 are delayed based on the delay amount, and transmits the created time schedule P to the group management device 2. Thereafter, the controller 53 of the substrate processing apparatus 1B re-acquires the readjustment instruction RA and the management information ASC from the group management device 2 to calculate a delay amount that causes the start time of the time schedule P4 to be the time t14 or later. The controller 53 of the substrate processing apparatus 1B creates a time schedule P in which the time schedule P4 and the time schedule P5 are delayed based on the delay amount. As a result, the time schedule P is adjusted as illustrated in FIGS. 16 and 17.

Figure 18:
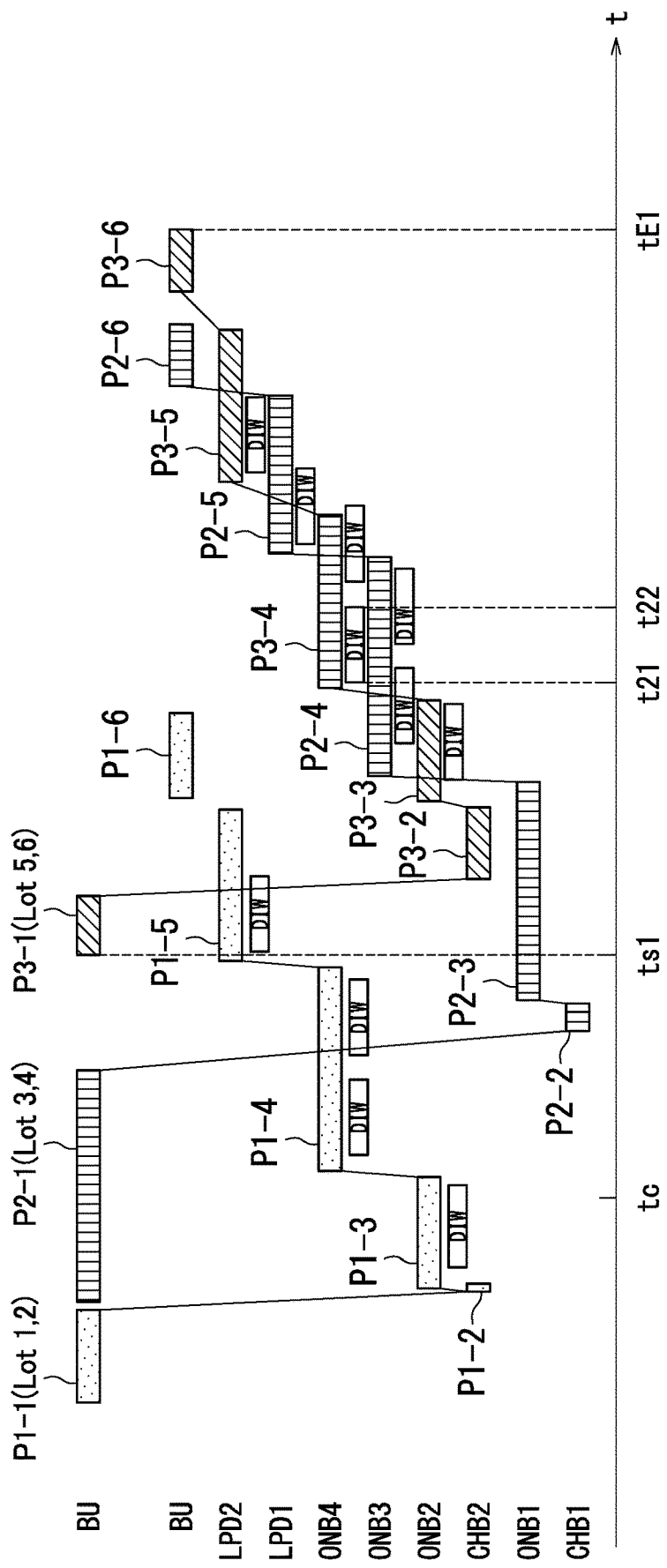
FIG. 18 is a diagram illustrating another example of the time schedule created by the controller of the substrate processing apparatus included in the substrate processing system in the embodiment.
Figure 19:
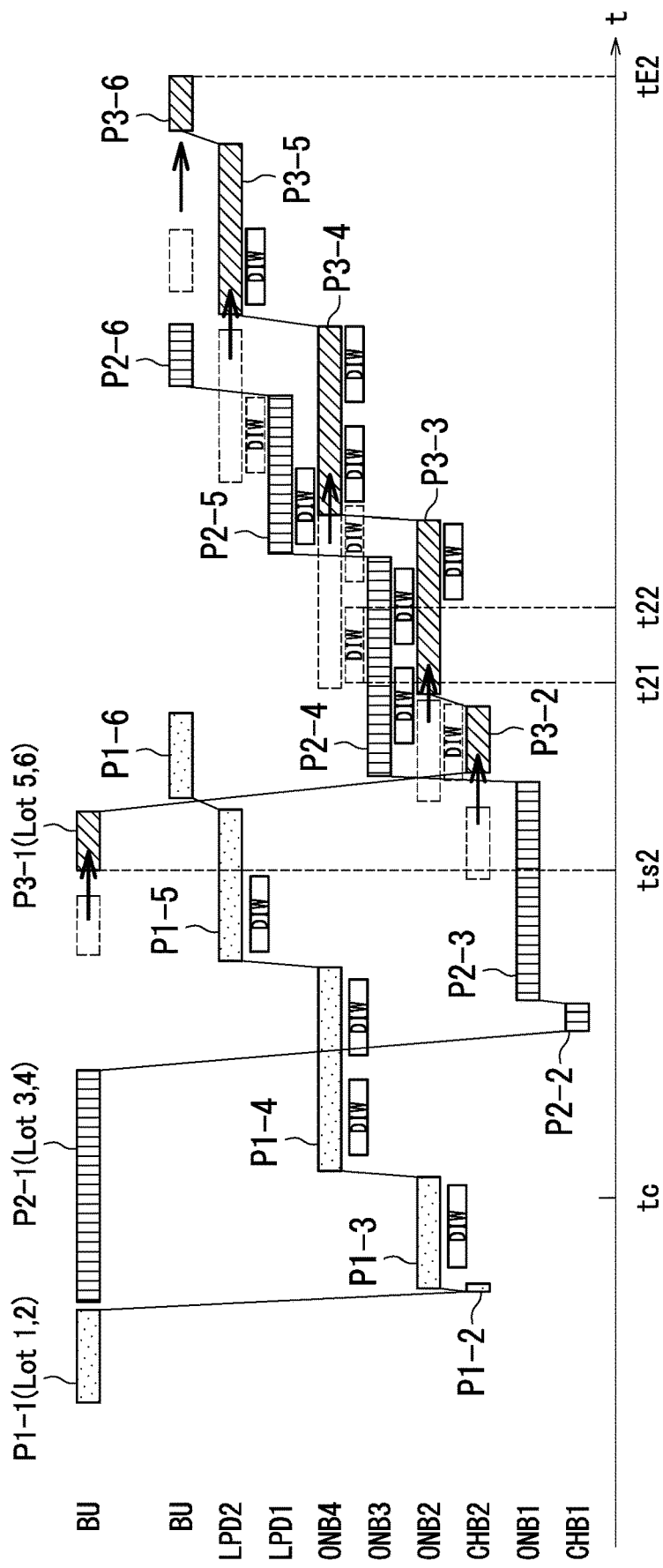
FIG. 19 is a diagram illustrating another example of the adjusted time schedule created by the controller of the substrate processing apparatus included in the substrate processing system in the embodiment.

The time schedule P created by the controller 53 of a substrate processing apparatus 1 will be described next with reference to FIGS. 18 and 19 using a case with the substrate processing apparatus 1B as an example. FIG. 18 is a diagram illustrating another example of the time schedule P created by the controller 53 of the substrate processing apparatus 1B included in the substrate processing system 100 of the present embodiment. FIG. 19 is a diagram illustrating another example of the adjusted time schedule P created by the controller 53 of the substrate processing apparatus 1B included in the substrate processing system 100 of the present embodiment. In each of FIGS. 18 and 19, the vertical axis indicates resources while the horizontal axis indicates time t. The time schedule P illustrated in each of FIGS. 18 and 19 includes time schedules P1 to P3. Note that the number following "-" indicates the number of a corresponding processing step.

As illustrated in FIGS. 18 and 19, the time schedule P1 indicates a flow of processing on two lots (a lot 1 and a lot 2). The time schedule P2 indicates a flow of processing on two lots (a lot 3 and a lot 4). The time schedule P3 indicates a flow of processing on two lots (a lot 5 and a lot 6).

The time schedule P1 includes processing steps P1-1 to P1-6. The time schedule P2 includes processing steps P2-1 to P2-6. The time schedule P3 includes processing steps P3-1 to P3-6. The flows of the processing defined in the time schedules P1 to P3 starts in the stated order.

As illustrated in FIGS. 18 and 19, the time schedule P1 indicates a use plan for the pure water DIW. Specifically, the time schedule P1 indicates use of the pure water DIW in the processing steps P1-3 to P1-5. In detail, the time schedule P1 indicates a period during which the pure water DIW is used. Similarly, the time schedules P2 and P3 each indicate a use plan for the pure water DIW.

The processing step P1-1 is a step of combining two lots 1 and 2 of substrates W into a set of the substrates W in the buffer unit BU. The processing step P2-2 is a step of performing preprocessing using the first chemical liquid tank CHB2. The processing step P3-3 is a step of performing cleaning and etching using the second chemical liquid tank ONB2. The processing step P1-4 is a step of performing cleaning and etching using the second chemical liquid tank ONB4. The processing step P1-5 is a step of performing drying using the drying tank LPD2. The processing step P1-6 is a step of performing processing to separate the set of substrates W into the two lots 1 and 2 in the buffer unit BU.

The processing step P2-1 is a step of combining the lots 3 and 4 of substrates W into a set of the substrates W in the buffer unit BU. The processing step P2-2 is a step of performing preprocessing using the first chemical liquid tank CHB1. The processing step P2-3 is a step of performing cleaning and etching using the second chemical liquid tank ONB1. The processing step P2-4 is a step of performing cleaning and etching using the second chemical liquid tank ONB3. The processing step P2-5 is a step of drying using the drying tank LPD1. The processing step P2-6 is a step of performing processing to separate the set of substrates W into the lots 3 and 4 in the buffer unit BU.

The processing step P3-1 is a step of combining lots 5 and 6 of substrates W into a set of the substrates W in the buffer unit BU. The processing step P3-2 is a step of performing preprocessing using the first chemical liquid tank CHB2. The processing step P3-3 is a step of performing cleaning and etching using the second chemical liquid tank ONB2. The processing step P3-4 is a step of performing cleaning and etching using the second chemical liquid tank ONB4. The processing step P3-5 is a step of performing drying using the drying tank LPD2. The processing step P3-6 is a step of performing processing to separate the set of substrates W into the lots 5 and 6 in the buffer unit BU.

In the example illustrated in FIG. 18, the processing defined in the time schedule P3 starts at time ts1. That is, the processing step P3-1 starts from the time ts1. As such, the time ts1 indicates a start time of the processing defined in the time schedule P3. Furthermore, the processing defined in the time schedule P3 ends at time $t_E1$. That is, the processing step P3-6 ends at the time $t_E1$. As such, the time $t_E1$ indicates an end time of the processing defined in the time schedule P3. In the following, the start time of the processing defined in the time schedule P3 may be referred to as "processing start time of the time schedule P3". Also, the end time of the processing defined in the time schedule P3 may be referred to as "processing end time of the time schedule P3".

In the example illustrated in FIG. 18, time tc indicates the current time. In the following, the time tc may be referred to as "current time tc". At the current time tc, the processing defined in each of the time schedules P1 and P2 has already started while the processing defined in the time schedule P3 does not start yet.

In the example illustrated in FIG. 18, the processing step P2-4 and the processing step P3-4 are executed simultaneously from time t21 to time t22 with a result that the DIW total flow rate exceeds the threshold value TH. Upon determination of the substrate processing apparatus 1B to be an instruction target apparatus, the controller 53 of the substrate processing apparatus 1B adjusts the time schedule P thereof.

The controller 53 of the substrate processing apparatus 1B adjusts a time schedule P, in the time schedules P1 to P3, of which processing does not yet start at the current time tc. That is, the controller 53 of the substrate processing apparatus 1B adjusts a time schedule P for non-processed substrates W. In the example illustrated in FIG. 18, the time schedule P according to which processing does not yet start at the current time tc is the time schedule P3. As such, the controller 53 of the substrate processing apparatus 1B delays the time schedule P3 as illustrated in FIG. 19.

Specifically, the controller 53 of the substrate processing apparatus 1B delays the time schedule P3 so that the time at which the pure water DIW is used in the processing step P3-4 differs from the time at which the pure water DIW is used in the processing step P2-4. As a result, the DIW total flow rate remains equal to or lower than the threshold value TH in all time. Furthermore, delay of the time schedule P3 delays the processing start time of the time schedule P3 from time ts1 to time ts2 and delays the processing end time of the time schedule P3 from time $t_E1$ to time $t_E2$.

Here, the adjustment amount calculation processing executed by the controller 53 of a substrate processing apparatus 1 will be described next with reference to FIGS. 18 and 19 using a case with the substrate processing apparatus 1B as an example. The controller 53 of the substrate processing apparatus 1B calculates an adjustment amount of the time schedule P3 based on the management information ASC so that the DIW total flow rate remains equal to or lower than the threshold value TH from time t21 to time t22. The controller 53 of the substrate processing apparatus 1B adjusts the time schedule P3 based on the adjustment amount. Specifically, the controller 53 of the substrate processing apparatus 1B calculates a delay amount that causes the start time of the processing step P3-4 to be time t22 or later. Alternatively, the controller 53 of the substrate processing apparatus 1B calculates a delay amount that causes the start time of the processing step P3-4 to be the end time of the processing step P2-4 or later. Thereafter, the controller 53 of the substrate processing apparatus 1B creates a time schedule P in which the time schedule P3 is delayed based on the delay amount. As a result, the time schedule P is adjusted as illustrated in FIGS. 18 and 19.

Embodiments of the present disclosure have been described so far with reference to the drawings (FIGS. 1 to 19). However, the present disclosure is not limited to the above embodiments and can be practiced in various manners within a scope not departing from the gist of the present disclosure. Furthermore, the elements of configuration disclosed in the above embodiments may be altered as appropriate. For example, a certain element of configuration of all the elements of configuration indicated in a given embodiment may be added to the elements of configuration in another embodiment or some of all the elements of configuration indicated in a given embodiment may be deleted from the embodiment.

The drawings schematically illustrate elements of configuration in order to facilitate understanding. Properties such as thickness, length, number, and intervals of each element of configuration illustrated in the drawings may differ from actual properties thereof in order to aid preparation of the drawings. Also, the configuration of each element of configuration described in the above embodiments is merely an example and not intended as specific limitations. Various alterations may be made within a scope not substantially departing from the effects of the present invention.

For example, a configuration in which the DIW use plan (time schedule P) is adjusted so that the total flow rate of the pure water DIW supplied from a single resource system PF remains equal to or lower than the threshold value TH is described in the embodiment described with reference to FIGS. 1 to 19. However, the control target is not limited to the total flow rate of the pure water DIW. For example, the total flow rate of the chemical liquid supplied from the resource system may be controlled.

Furthermore, in the embodiment described with reference to FIGS. 1 to 19, the controller 53 of a substrate processing apparatus 1 (instruction target apparatus) adjusts the DIW use plan (time schedule P) by referring to the management information ASC but may adjust the DIW use plan (time schedule P) by referring to the DIW total flow rate. In this case, the processing section 203 of the group management device 2 transmits the total flow rate information AFR together with the readjustment instruction RA to the instruction target apparatus via the second communication section 201.

The controller 53 of a substrate processing apparatus 1 (instruction target apparatus) calculates an adjustment amount (delay amount) of the DIW use plan (time schedule P) in the embodiment described with reference to FIGS. 1 to 19. However, the processing section 203 of the group management device 2 may calculate an adjustment amount (delay amount) of the DIW use plan (time schedule P) of the instruction target apparatus based on the management information ASC or the DIW total flow rate. In this case, the processing section 203 of the group management device 2 transmits together with the readjustment instruction RA adjustment amount information indicating the adjustment amount (delay amount) of the DIW use plan (time schedule P) to the instruction target apparatus via the second communication section 201. In response, the controller 53 of the instruction target apparatus creates a DIW use plan (time schedule P) that causes the DIW total flow rate to be equal to or lower than the threshold value TH based on the adjustment amount information.

Figure 20:
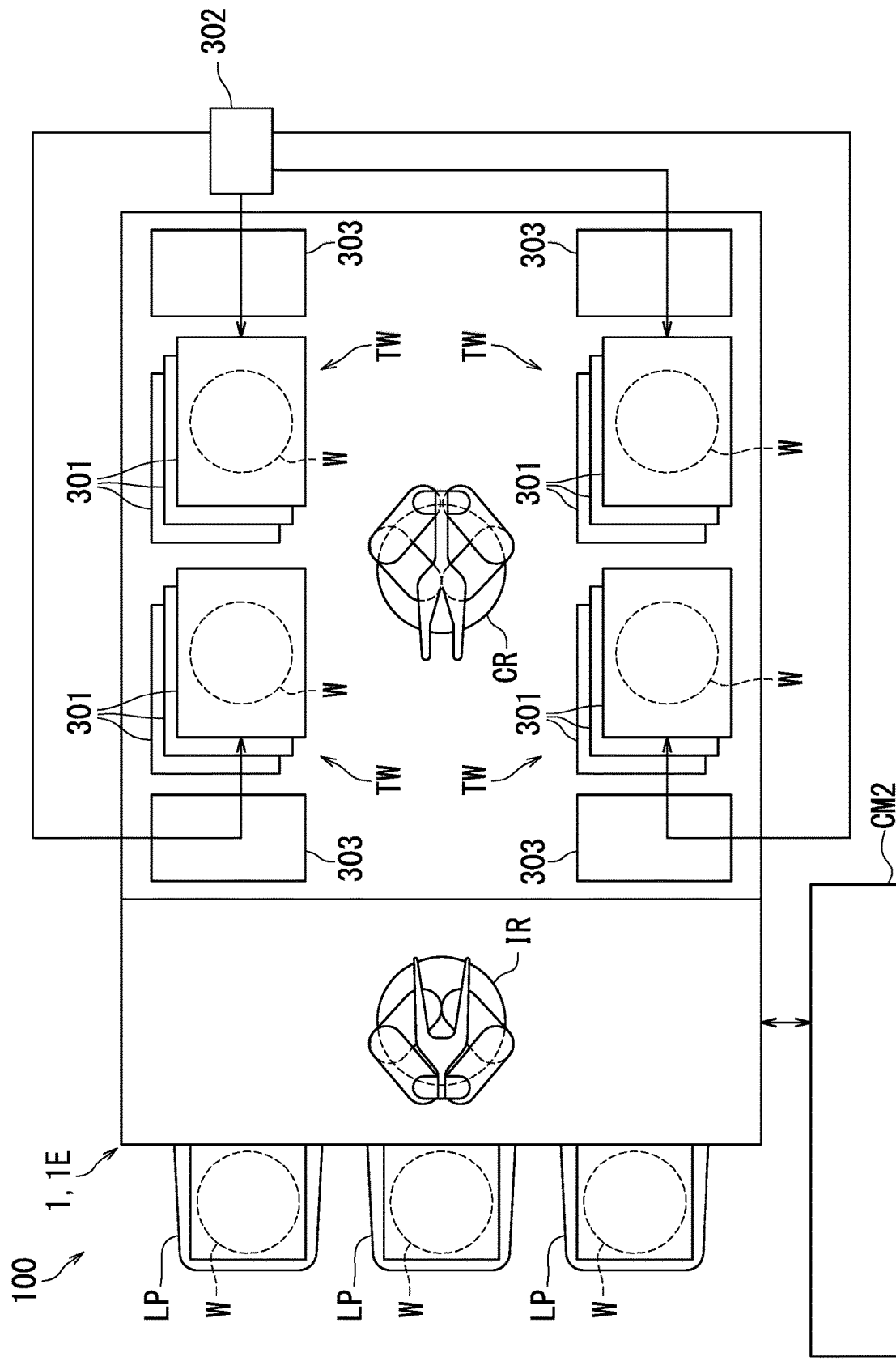
FIG. 20 is a schematic diagram of a substrate processing apparatus included in a substrate processing system according to another embodiment.

In the embodiment described with reference to FIGS. 1 to 19, the substrate processing apparatuses 1 are of batch type but may be of single-wafer type. The following describes another embodiment of the substrate processing apparatuses 1 with reference to FIG. 20. FIG. 20 is a schematic diagram of a substrate processing apparatus 1 according to the other embodiment. In detail, FIG. 20 is a schematic plan view of the substrate processing apparatus 1 included in the substrate processing system 100 of the other embodiment. In the following, the substrate processing apparatus 1 illustrated in FIG. 20 may be referred to as "substrate processing apparatus 1E". The substrate processing apparatus 1E processes substrates W. More specifically, the substrate processing apparatus 1E is of single-wafer type and executes substrate processing on a basis of substrate W by substrate W.

As illustrated in FIG. 20, the substrate processing apparatus 1E includes a plurality of processing units 301, a fluid cabinet 302, a plurality of fluid boxes 303, a plurality of load ports LP, an indexer robot IR, a center robot CR, and a computer CM2.

Substrates W are loaded at the load ports LP. More specifically, the accommodation sections 10 described with reference to FIG. 5 are loaded at the respective load ports LP. The indexer robot IR transports the substrates W between a load port LP and the center robot CR. More specifically, the indexer robot IR transports the substrates W between the center robot CR and an accommodation section 10 loaded at a load port LP. The center robot CR transports the substrates W between the indexer robot IR and a processing unit 301. Note that a loading table (path) on which the substrates W are temporarily loaded may be provided between the indexer robot IR and the center robot CR to constitute an apparatus configuration in which each substrate W is indirectly delivered between the indexer robot IR and the center robot CR via the loading table.

The processing units 301 form a plurality of towers TW (four towers TW in FIG. 20). The towers TW are arranged so as to surround the center robot CR as viewed in plan. Each of the towers TW includes a plurality of processing units 301 (three processing units 301 in FIG. 20) vertically stacked one on the other.

The fluid cabinet 302 contains the processing liquid. The fluid boxes 303 are each provided for a corresponding one of the towers TW. The processing liquid in the fluid cabinet 302 is supplied to all the processing units 301 included in the towers TW corresponding to the respective fluid boxes 303 via the corresponding fluid boxes 303.

The processing units 301 each process a substrate W by supplying the processing liquid to the substrate W. The processing liquid includes the pure water DIW and the chemical liquid.

The computer CM2 controls operation of each element of the substrate processing apparatus 1E. For example, the computer CM2 controls the load ports LP, the indexer robot IR, the center robot CR, and the processing units 301.

The computer CM2 creates and transmits to the group management device 2 a DIW use plan (time schedule P) likewise the computer CM1 described with reference to FIGS. 1 to 19. Furthermore, upon receiving the readjustment instruction RA and the management information ASC from the group management device 2, the computer CM2 refers to the management information ASC to create a DIW use plan (time schedule P) that causes the DIW total flow rate to be equal to or lower than the threshold value TH likewise the computer CM1 described with reference to FIGS. 1 to 19. The configuration of the computer CM2 and the processing executed by the computer CM2 are the same as those of the computer CM1 described with reference to FIGS. 1 to 19. Therefore, detailed description thereof is omitted.

Note that in a case of each of the substrate processing apparatuses 1 being of single-wafer type, the substrate processing period described with reference to FIG. 11 includes a time at which a non-processed substrate W loaded at a load port LP of the substrate processing apparatus 1 is transported into the substrate processing apparatus 1 by the indexer robot IR and a time at which the substrate W is processed by the processing unit 301 and loaded on another load port LP of the substrate processing apparatus 1 by the indexer robot IR. More specifically, the substrate processing period includes a time at which a non-processed substrate W accommodated in an accommodation section 10 loaded on a load port LP of the substrate processing apparatus 1 is transported into the substrate processing apparatus 1 by the indexer robot IR and a time at which the substrate W is processed by the processing unit 301, accommodated in an accommodation section 10 loaded on another load port LP of the substrate processing apparatus 1 by the indexer robot IR.

Furthermore, in a case of each of the substrate processing apparatuses 1 being of single-wafer type, the processing end time is a substrate bringing-out time. That is, the processing end timing is a timing when a processed substrate W is loaded on a load port LP by the indexer robot IR. More specifically, the processing end timing is a timing when a processed substrate W is accommodated in an accommodation section 10 loaded on a load ports LP. Similarly, in a case of each of the substrate processing apparatuses 1 being of single-wafer type, the processing start timing is a substrate bringing-in timing. That is, the processing start timing is a timing when a non-processed substrate W loaded on a load port LP is transported into the substrate processing apparatus 1 by the indexer robot IR. More specifically, the processing start timing is a timing when a non-processed substrate W is transported into the substrate processing apparatus 1 by the indexer robot IR from an accommodation section 10 loaded on a load port LP.

What is claimed is:

1. A substrate processing system comprising:
a plurality of substrate processing apparatuses each configured to perform processing on a substrate; and
a group manager configured to manage the substrate processing apparatuses, wherein
each of the substrate processing apparatuses includes:
a plan creator that creates a plan indicating a timing when a processing liquid is used and a flow rate of the processing liquid; and
a first communicator that performs communication with the group manager to transmit the plan to the group manager,
the processing liquid is supplied to the substrate processing apparatuses from a single resource system,
the group manager includes:
storage that stores therein a threshold value for the flow rate of the processing liquid supplied from the single resource system;
a second communicator that performs communication with the substrate processing apparatuses to receive the plans from the respective substrate processing apparatuses; and
a processor that acquires a total flow rate of the processing liquid to be used by the substrate processing apparatuses based on the plans received by the second communicator and that determines whether or not the total flow rate exceeds the threshold value,
in response to determination that the total flow rate exceeds the threshold value, the processor instructs via the second communicator one substrate processing apparatus of the substrate processing apparatuses to adjust the plan of the one substrate processing apparatus,
the plan creator of an instruction target apparatus creates an adjusted plan that causes the total flow rate to be equal to or lower than the threshold value, the instruction target apparatus being the one substrate processing apparatus to which plan adjustment is instructed,
in instructing the plan adjustment, the processor transmits the plans of the substrate processing apparatuses or the total flow rate of the processing liquid to the instruction target apparatus via the second communicator,
the plan creator of the instruction target apparatus creates the adjusted plan that causes the total flow rate to be equal to or lower than the threshold value based on the plans of the substrate processing apparatuses or the total flow rate of the processing liquid, and
the instruction target apparatus utilizes the adjusted plan to control a flow of the processing liquid to reach a target flow rate established by the adjusted plan.

2. The substrate processing system according to claim 1, wherein
the adjusted plan created by the plan creator of the instruction target apparatus corresponds to a plan for the substrate before the processing starts.

3. The substrate processing system according to claim 1, wherein
the processor determines the instruction target apparatus based on transmission timings that are timings when the substrate processing apparatuses transmit the respective plans to the group manager.

4. The substrate processing system according to claim 3, wherein
the processor determines a substrate processing apparatus of the substrate processing apparatuses that has a latest transmission timing of the transmission timings of the substrate processing apparatuses to be the instruction target apparatus.

5. The substrate processing system according to claim 1, wherein
the plans of the substrate processing apparatuses each indicate a substrate processing period that is a period from a time at which the substrate is brought into a corresponding one substrate processing apparatus of the substrate processing apparatuses from outside to a time at which the substrate is brought out of the corresponding one substrate processing apparatus, and
the processor determines the instruction target apparatus based on the substrate processing periods.

6. The substrate processing system according to claim 5, wherein
the processor determines a substrate processing apparatus of the substrate processing apparatuses that has a shortest substrate processing period of the substrate processing periods of the substrate processing apparatuses to be the instruction target apparatus.

7. The substrate processing system according to claim 1, wherein
the plans of the substrate processing apparatuses each indicate a processing end timing when the processing of the substrate ends or a substrate bringing-out timing when the substrate is brought out of a corresponding one the substrate processing apparatuses, and
the processor determines the instruction target apparatus based on the processing end timings or the substrate bringing-out timings.

8. The substrate processing system according to claim 7, wherein
the processor determines a substrate processing apparatus of the substrate processing apparatuses that has a latest processing end timing of the processing end timings or a latest substrate bringing-out timing of the substrate bringing-out timings of the substrate processing apparatuses to be the instruction target apparatus.

9. The substrate processing system according to claim 1, wherein
the plans of the substrate processing apparatuses each indicate a processing start timing when the processing of the substrate starts or a substrate bringing-in timing when the substrate is brought into a corresponding one of the substrate processing apparatuses from outside, and
the processor determines the instruction target apparatus based on the processing start timings or the substrate bringing-in timings.

10. The substrate processing system according to claim 9, wherein
the processor determines a substrate processing apparatus of the substrate processing apparatuses that has a latest processing start timing of the processing start timings or a latest substrate bringing-in timing of the substrate bringing-in timings of the substrate processing apparatuses to be the instruction target apparatus.

11. A substrate processing system comprising:
a plurality of substrate processing apparatuses each configured to perform processing on a substrate; and
a group manager configured to manage the substrate processing apparatuses, wherein
each of the substrate processing apparatuses includes:
   a plan creator that creates a plan indicating a timing when a processing liquid is used and a flow rate of the processing liquid; and
   a first communicator that performs communication with the group manager to transmit the plan to the group manager,
the processing liquid is supplied to the substrate processing apparatuses from a single resource system,
the group manager includes:
   storage that stores therein a threshold value for the flow rate of the processing liquid supplied from the single resource system;
   a second communicator that performs communication with the substrate processing apparatuses to receive the plans from the respective substrate processing apparatuses; and
   a processor that acquires a total flow rate of the processing liquid to be used by the substrate processing apparatuses based on the plans received by the second communicator and that determines whether or not the total flow rate exceeds the threshold value,
in response to determination that the total flow rate exceeds the threshold value, the processor instructs via the second communicator one substrate processing apparatus of the substrate processing apparatuses to adjust the plan of the one substrate processing apparatus,
the plan creator of an instruction target apparatus creates an adjusted plan that causes the total flow rate to be equal to or lower than the threshold value, the instruction target apparatus being the one substrate processing apparatus to which plan adjustment is instructed,
the processor generates adjustment amount information indicating an adjustment amount based on the plans of the substrate processing apparatuses or the total flow rate of the processing liquid, the adjustment amount indicating an adjustment amount that causes the total flow rate to be equal to or lower than the threshold value,
in instructing the plan adjustment, the processor transmits the adjustment amount information to the instruction target apparatus via the second communicator,
the adjusted plan created by the plan creator of the instruction target apparatus is a plan that causes the total flow rate to be equal to or lower than the threshold value based on the adjustment amount information, and
the instruction target apparatus utilizes the adjusted plan to control a flow of the processing liquid to reach a target flow rate established by the adjusted plan.

12. The substrate processing system according to claim 11, wherein the adjusted plan created by the plan creator of the instruction target apparatus corresponds to a plan for the substrate before the processing starts.

13. The substrate processing system according to claim 11, wherein the processor determines the instruction target apparatus based on transmission timings that are timings when the substrate processing apparatuses transmit the respective plans to the group manager.

14. The substrate processing system according to claim 13, wherein
the processor determines a substrate processing apparatus of the substrate processing apparatuses that has a latest transmission timing of the transmission timings of the substrate processing apparatuses to be the instruction target apparatus.

15. The substrate processing system according to claim 11, wherein the plans of the substrate processing apparatuses each indicate a substrate processing period that is a period from a time at which the substrate is brought into a corresponding one substrate processing apparatus of the substrate processing apparatuses from outside to a time at which the substrate is brought out of the corresponding one substrate processing apparatus, and
the processor determines the instruction target apparatus based on the substrate processing periods.

16. The substrate processing system according to claim 15, wherein the processor determines a substrate processing apparatus of the substrate processing apparatuses that has a shortest substrate processing period of the substrate processing periods of the substrate processing apparatuses to be the instruction target apparatus.

17. The substrate processing system according to claim 11, wherein the plans of the substrate processing apparatuses each indicate a processing end timing when the processing of the substrate ends or a substrate bringing-out timing when the substrate is brought out of a corresponding one the substrate processing apparatuses, and
the processor determines the instruction target apparatus based on the processing end timings or the substrate bringing-out timings.

18. The substrate processing system according to claim 17, wherein
the processor determines a substrate processing apparatus of the substrate processing apparatuses that has a latest processing end timing of the processing end timings or a latest substrate bringing-out timing of the substrate bringing-out timings of the substrate processing apparatuses to be the instruction target apparatus.

19. The substrate processing system according to claim 11, wherein
the plans of the substrate processing apparatuses each indicate a processing start timing when the processing of the substrate starts or a substrate bringing-in timing when the substrate is brought into a corresponding one of the substrate processing apparatuses from outside, and
the processor determines the instruction target apparatus based on the processing start timings or the substrate bringing-in timings.

20. The substrate processing system according to claim 19, wherein the processor determines a substrate processing apparatus of the substrate processing apparatuses that has a latest processing start timing of the processing start timings or a latest substrate bringing-in timing of the substrate bringing-in timings of the substrate processing apparatuses to be the instruction target apparatus.

* * * * *